US008296298B1

(12) United States Patent
Redman

(10) Patent No.: US 8,296,298 B1
(45) Date of Patent: Oct. 23, 2012

(54) PERFORMANCE FACILITATION AND TRACKING SYSTEM

(76) Inventor: Jean S. Redman, New Smyrna Beach, FL (US)

( * ) Notice: Subject to any disclaimer, the term of this patent is extended or adjusted under 35 U.S.C. 154(b) by 143 days.

(21) Appl. No.: 12/536,479

(22) Filed: Aug. 5, 2009

Related U.S. Application Data

(60) Provisional application No. 61/137,996, filed on Aug. 5, 2008.

(51) Int. Cl.
*G06F 17/30* (2006.01)

(52) U.S. Cl. ........................................ 707/736; 705/7.17

(58) Field of Classification Search .................. 707/736, 707/999.107, 999.104; 715/7.17
See application file for complete search history.

(56) References Cited

U.S. PATENT DOCUMENTS

| | | | | |
|---|---|---|---|---|
| 5,818,737 | A * | 10/1998 | Orr et al. | 703/6 |
| 6,067,549 | A * | 5/2000 | Smalley et al. | 707/999.104 |
| 2001/0044729 | A1* | 11/2001 | Pomerance | 705/1 |
| 2002/0133383 | A1* | 9/2002 | Chao et al. | 705/7 |
| 2003/0110073 | A1* | 6/2003 | Briel et al. | 705/10 |
| 2005/0251433 | A1* | 11/2005 | Orifici et al. | 705/7 |
| 2006/0041436 | A1* | 2/2006 | Brodie et al. | 705/1 |
| 2006/0211404 | A1* | 9/2006 | Cromp et al. | 455/405 |
| 2007/0027875 | A1* | 2/2007 | Mitchell et al. | 707/10 |

* cited by examiner

*Primary Examiner* — Yuk Ting Choi

(74) *Attorney, Agent, or Firm* — Allen, Dyer, Doppelt, Milbrath & Gilchrist, P.A.

(57) ABSTRACT

A performance facilitation and tracking system includes a server configured with an interface module having a plurality of submodules for a plurality of user types and a database module having cross-linked databases of entities requesting performance, entities performing and entities benefiting from performance, and cross-linked databases of incidents related to performance.

20 Claims, 37 Drawing Sheets

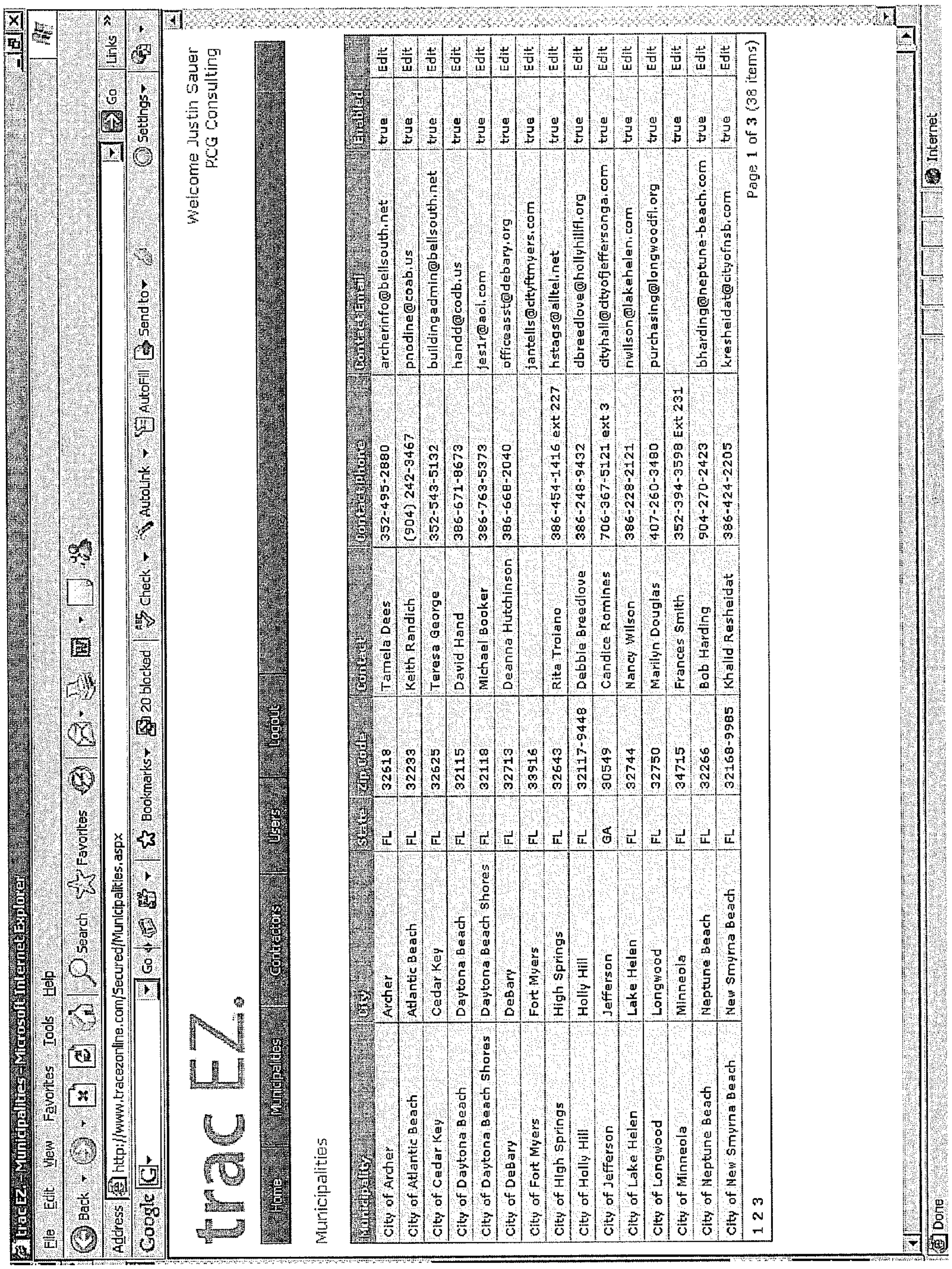

| Municipality | City | State | Zip Code | Contact | Contact Phone | Contact Email | Enabled | |
|---|---|---|---|---|---|---|---|---|
| City of Archer | Archer | FL | 32618 | Tamela Dees | 352-495-2880 | archerinfo@bellsouth.net | true | Edit |
| City of Atlantic Beach | Atlantic Beach | FL | 32233 | Keith Randich | (904) 242-3467 | pnodine@coab.us | true | Edit |
| City of Cedar Key | Cedar Key | FL | 32625 | Teresa George | 352-543-5132 | buildingadmin@bellsouth.net | true | Edit |
| City of Daytona Beach | Daytona Beach | FL | 32115 | David Hand | 386-671-8673 | handd@codb.us | true | Edit |
| City of Daytona Beach Shores | Daytona Beach Shores | FL | 32118 | Michael Booker | 386-763-5373 | jes1r@aol.com | true | Edit |
| City of DeBary | DeBary | FL | 32713 | Deanna Hutchinson | 386-668-2040 | officeasst@debary.org | true | Edit |
| City of Fort Myers | Fort Myers | FL | 33916 | | | jantells@cityftmyers.com | true | Edit |
| City of High Springs | High Springs | FL | 32643 | Rita Troiano | 386-454-1416 ext 227 | hstags@alltel.net | true | Edit |
| City of Holly Hill | Holly Hill | FL | 32117-9448 | Debbie Breedlove | 386-248-9432 | dbreedlove@hollyhillfl.org | true | Edit |
| City of Jefferson | Jefferson | GA | 30549 | Candice Romines | 706-367-5121 ext 3 | cityhall@cityofjeffersonga.com | true | Edit |
| City of Lake Helen | Lake Helen | FL | 32744 | Nancy Wilson | 386-228-2121 | nwilson@lakehelen.com | true | Edit |
| City of Longwood | Longwood | FL | 32750 | Marilyn Douglas | 407-260-3480 | purchasing@longwoodfl.org | true | Edit |
| City of Minneola | Minneola | FL | 34715 | Frances Smith | 352-394-3598 Ext 231 | | true | Edit |
| City of Neptune Beach | Neptune Beach | FL | 32266 | Bob Harding | 904-270-2423 | bharding@neptune-beach.com | true | Edit |
| City of New Smyrna Beach | New Smyrna Beach | FL | 32168-9985 | Khalid Resheidat | 386-424-2205 | kresheidat@cityofnsb.com | true | Edit |

1 2 3 Page 1 of 3 (38 items)

FIG. 29

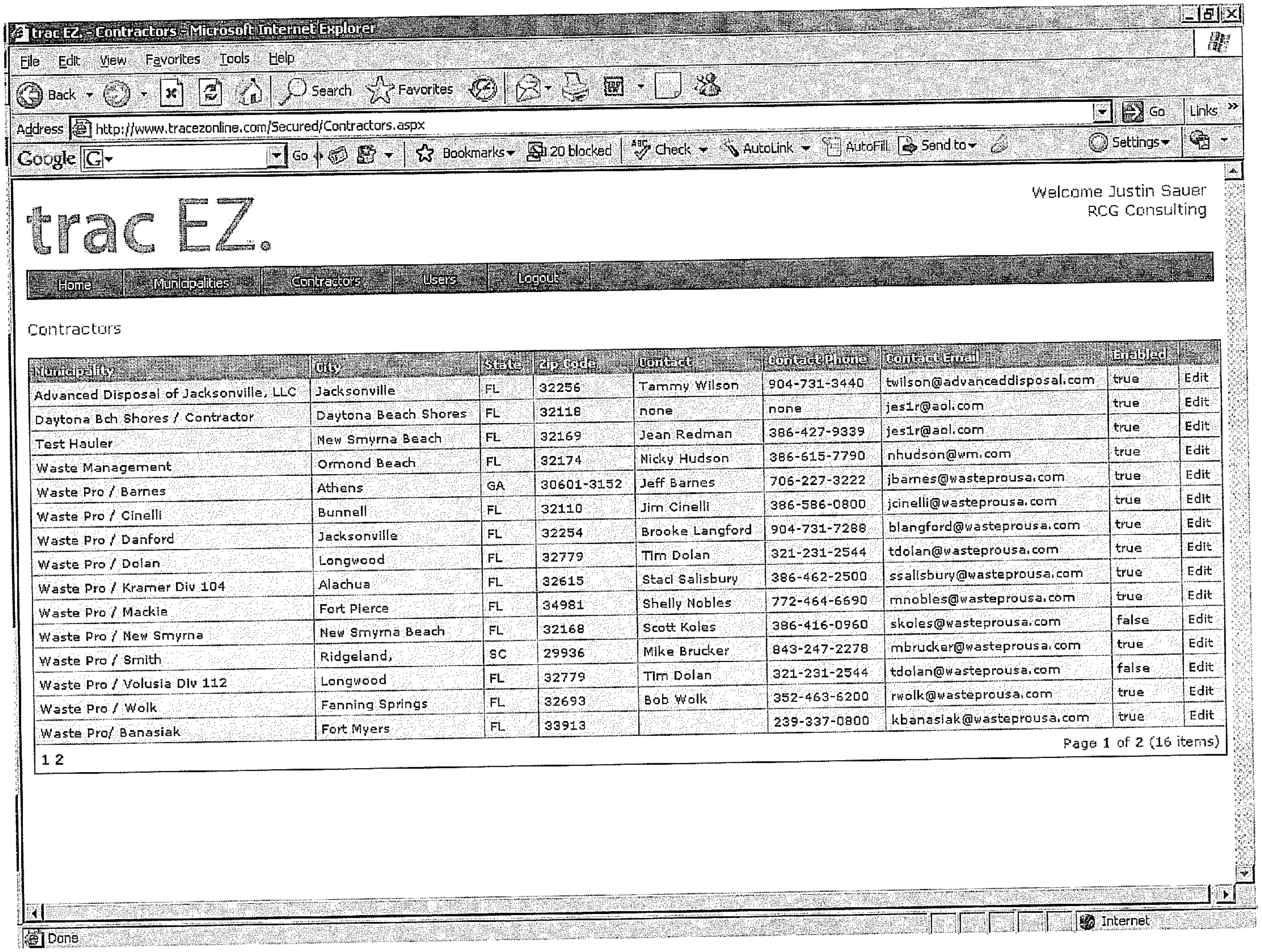

| Municipality | City | State | Zip Code | Contact | Contact Phone | Contact Email | Enabled | |
|---|---|---|---|---|---|---|---|---|
| Advanced Disposal of Jacksonville, LLC | Jacksonville | FL | 32256 | Tammy Wilson | 904-731-3440 | twilson@advanceddisposal.com | true | Edit |
| Daytona Bch Shores / Contractor | Daytona Beach Shores | FL | 32118 | none | none | jes1r@aol.com | true | Edit |
| Test Hauler | New Smyrna Beach | FL | 32169 | Jean Redman | 386-427-9339 | jes1r@aol.com | true | Edit |
| Waste Management | Ormond Beach | FL | 32174 | Nicky Hudson | 386-615-7790 | nhudson@wm.com | true | Edit |
| Waste Pro / Barnes | Athens | GA | 30601-3152 | Jeff Barnes | 706-227-3222 | jbarnes@wasteprousa.com | true | Edit |
| Waste Pro / Cinelli | Bunnell | FL | 32110 | Jim Cinelli | 386-586-0800 | jcinelli@wasteprousa.com | true | Edit |
| Waste Pro / Danford | Jacksonville | FL | 32254 | Brooke Langford | 904-731-7288 | blangford@wasteprousa.com | true | Edit |
| Waste Pro / Dolan | Longwood | FL | 32779 | Tim Dolan | 321-231-2544 | tdolan@wasteprousa.com | true | Edit |
| Waste Pro / Kramer Div 104 | Alachua | FL | 32615 | Staci Salisbury | 386-462-2500 | ssalisbury@wasteprousa.com | true | Edit |
| Waste Pro / Mackie | Fort Pierce | FL | 34981 | Shelly Nobles | 772-464-6690 | mnobles@wasteprousa.com | true | Edit |
| Waste Pro / New Smyrna | New Smyrna Beach | FL | 32168 | Scott Koles | 386-416-0960 | skoles@wasteprousa.com | false | Edit |
| Waste Pro / Smith | Ridgeland, | SC | 29936 | Mike Brucker | 843-247-2278 | mbrucker@wasteprousa.com | true | Edit |
| Waste Pro / Volusia Div 112 | Longwood | FL | 32779 | Tim Dolan | 321-231-2544 | tdolan@wasteprousa.com | false | Edit |
| Waste Pro / Wolk | Fanning Springs | FL | 32693 | Bob Wolk | 352-463-6200 | rwolk@wasteprousa.com | true | Edit |
| Waste Pro/ Banasiak | Fort Myers | FL | 33913 | | 239-337-0800 | kbanasiak@wasteprousa.com | true | Edit |

1 2 Page 1 of 2 (16 items)

FIG. 34

PERFORMANCE FACILITATION AND TRACKING SYSTEM

CROSS-REFERENCE TO RELATED APPLICATION

This application claims the benefit of U.S. Provisional Application No. 61/137,996, filed on Aug. 5, 2008, the contents of which application is herein incorporated by reference in its entirety.

FIELD OF THE INVENTION

The present invention relates to facilitation and tracking of the performance of obligations between entities.

BACKGROUND OF THE INVENTION

In numerous commercial, governmental or other dealings, for example contractual dealings, a common arrangement including a first entity responsible for dealing with a second entity to ensure goods or services are provided to some third entity. In a concrete example, municipalities are frequently charged with responsibility for waste collection. The municipality, or a department thereof, often contracts with a private garbage hauler to discharge this responsibility. The ultimate beneficiaries are the local recipients of garbage services.

To effectively discharge its responsibilities, the municipality frequently has a contract providing for performance indicia to determine whether or not the garbage hauler is meeting its obligations. These indicia may impact the amount the municipality is obliged to pay the garbage hauler, as well as the continued existence of the contract. Common indicia include the number of complaints submitted by residents and the consistency and promptness with which the contractor responds to complaints or other requests.

Currently, it is difficult to track such indicia to monitor performance under the contract. Reporting and recording of incidents is often very inconsistent. Additionally, the timeliness with which the garbage hauler is informed of any incidents (affecting the perceived promptness with which the hauler responded) is frequently a bone of contention.

SUMMARY OF THE INVENTION

In view of the foregoing, it is an object of the present invention to provide a system for facilitating and tracking performance of obligations between entities, contractual or otherwise. According to an embodiment of the present invention, a performance facilitation and tracking system includes a server configured with an interface module having a plurality of submodules for a plurality of user types and a database module having cross-linked databases of entities requesting performance, entities performing and entities benefiting from performance, and cross-linked databases of incidents related to performance.

These and other objects, aspects and advantages of the present invention will be better understood in view of the drawings and following description of a preferred embodiment.

BRIEF DESCRIPTION OF THE DRAWINGS

FIGS. 27-37 are screens associated with operations of a system administration interface submodule of the interface module of FIG. 2.

DETAILED DESCRIPTION OF A PREFERRED EMBODIMENT

Figure 1:
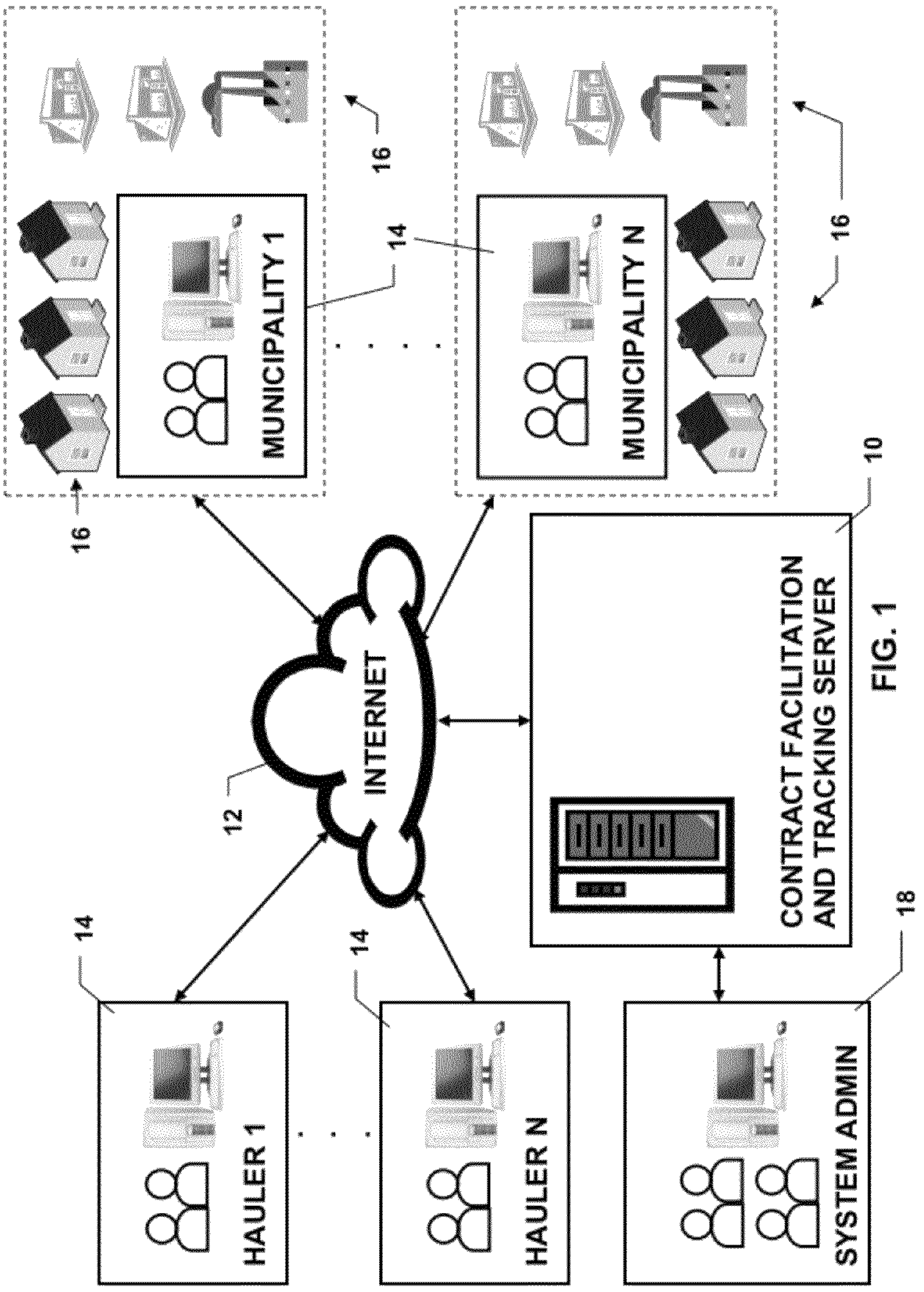
FIG. 1 is an organizational overview of a system for facilitating and tracking contract performance, including a server, according to an embodiment of the present invention.

Referring to FIG. 1, a system for facilitating and tracking contract performance includes a server 10 connected to one or more networks 12, such as the Internet. The server 10 is accessible by a plurality of system users, including contract parties 14, contract beneficiaries 16 and a system administrator 18. In the described embodiment, the contracts being tracked include garbage hauling contracts. The contracting parties include political subdivisions, such as municipalities, which are contracting out garbage hauling services, and garbage haulers contracted to perform the garbage hauling services. The contract beneficiaries include residents and other entities receiving services from the municipalities; for example, local businesses.

Figure 2:
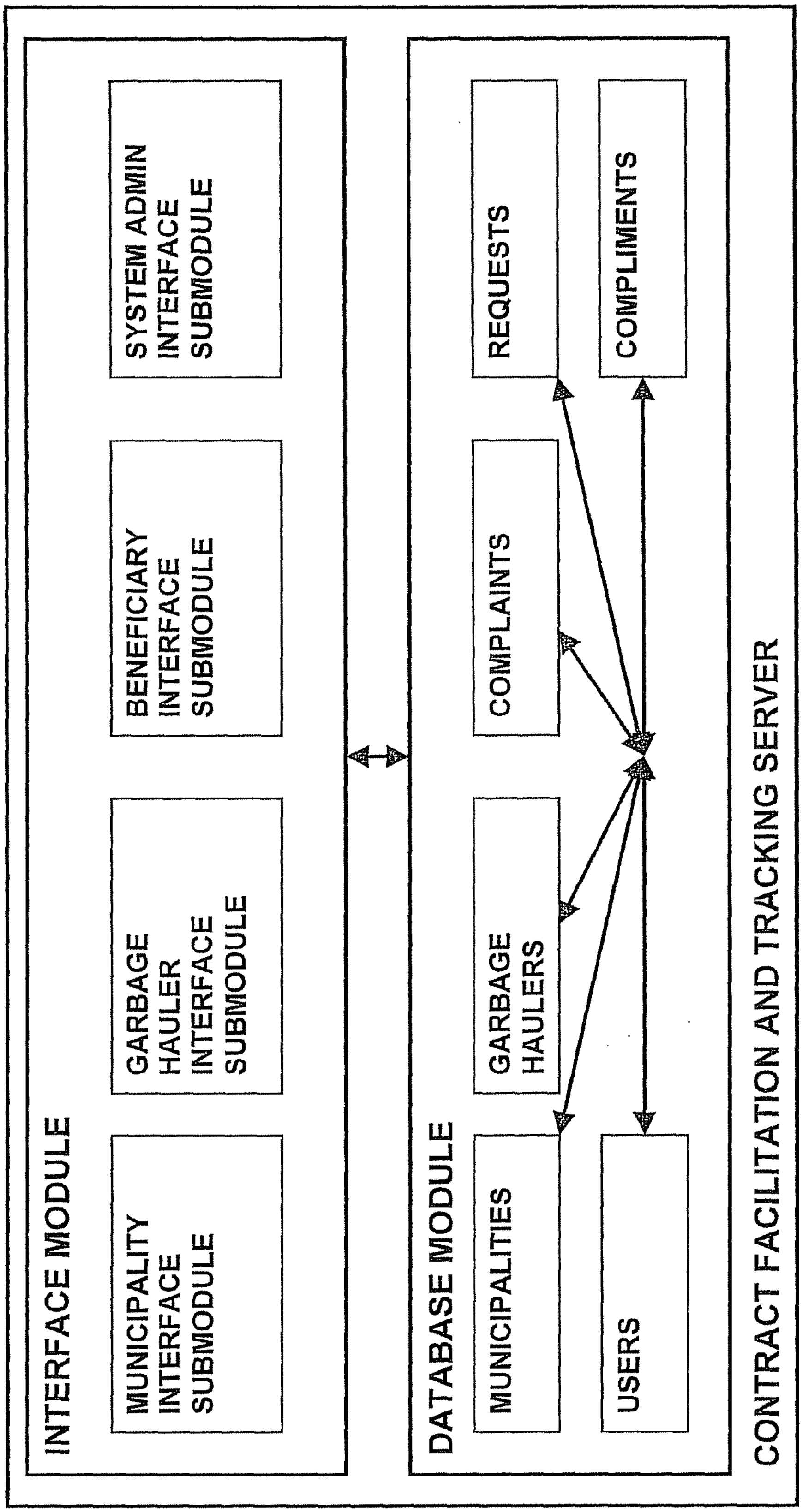
FIG. 2 is an organizational overview of the server of FIG. 1, including an interface module and a database module.

Referring to FIG. 2, the server is configured with a database module having cross-indexed databases of municipalities, garbage haulers, and individual users associated with the municipalities, garbage haulers and the system administrator. Additionally, the server is configured with contract incident databases, including, for example, complaints, requests and compliments relating to performance under the contract. The complaint, request and compliment databases are also cross-indexed with the corresponding municipalities and garbage haulers.

The server is further configured with an interface module, through which the databases are selectively accessible to system users. The interface module includes a plurality of submodules; for example, a municipality interface submodule, garbage hauler interface submodule, beneficiary interface submodule and system administrator interface submodule.

Figure 3:
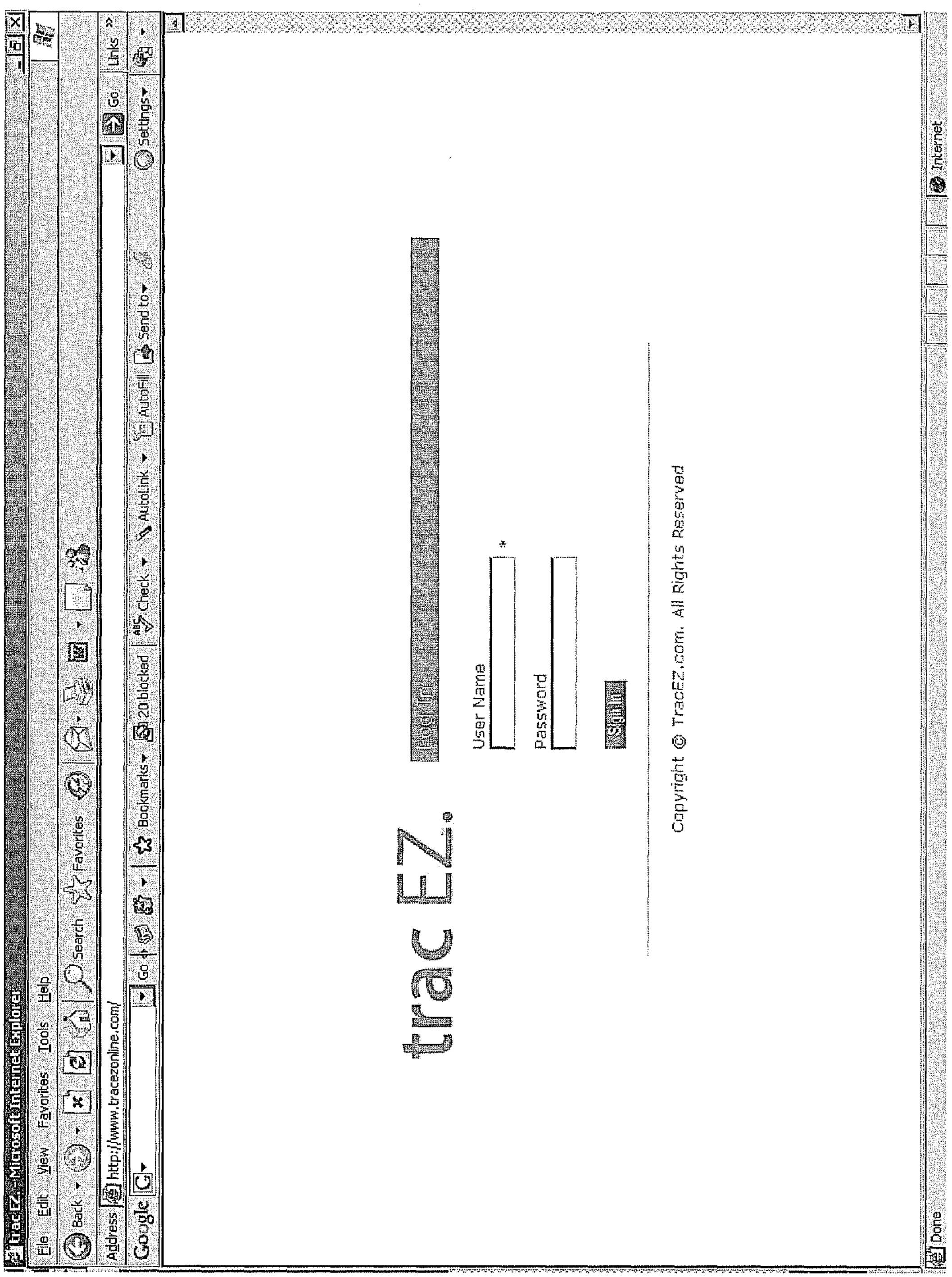
FIG. 3 is logon screen displayed by the interface module of FIG. 2.

Further features and aspects of the present invention will be appreciated as operation of an exemplary system is explained with reference to illustrative screens thereof. Referring to FIG. 3, upon initially accessing the system, a user is presented with a logon screen and prompted to enter a username and password assigned to the user. As will explained in greater detail below, a user type (e.g., municipality, garbage hauler, or system administrator) is associated with each user. The interface submodule through which the user interfaces with the server is determined based on the associated user type. As will also be explained below, contract beneficiaries do not access the server through the logon screen.

Figure 4:
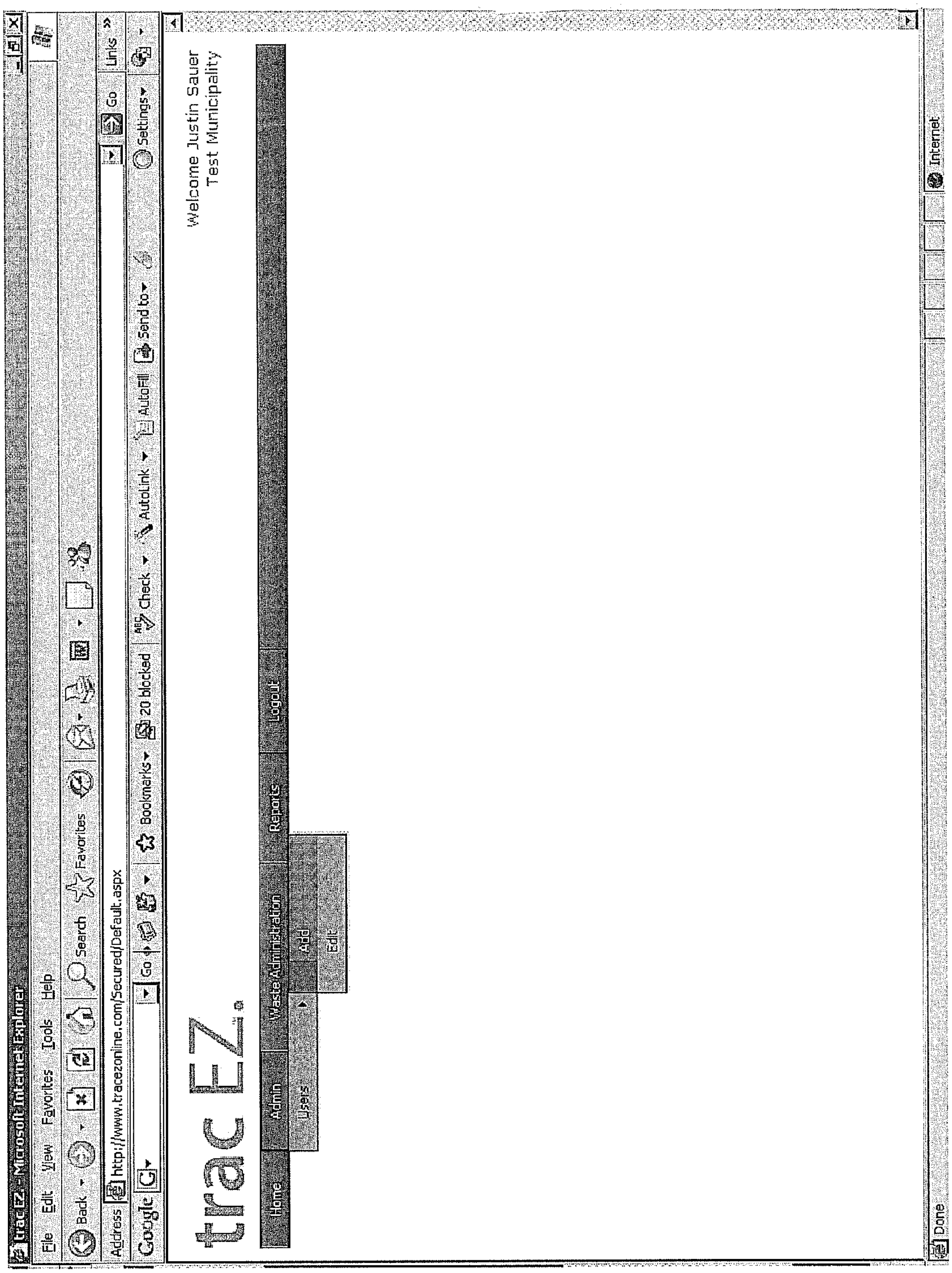
FIGS. 4-24 are screens associated with operations of the municipality interface submodule of the interface module of FIG. 2.

With reference to FIGS. 4-24, operation and features of the municipality interface submodule are described. Referring to FIG. 4, upon login of a municipality-associated user, a municipality "Home" screen is displayed, with a plurality of drop down menus. For example, "Admin", "Waste Administration" and "Reports" drop down menus are presented. A "Home" selection and "Logout" selection are also provided. It will, be understood that additional or different drop down menus could be presented and that menus presented to a given user can be determined based on permissions associated with that user. For example, municipality-associated users without municipality administrative permissions are not presented with the "Admin" drop down menu.

Figure 5:
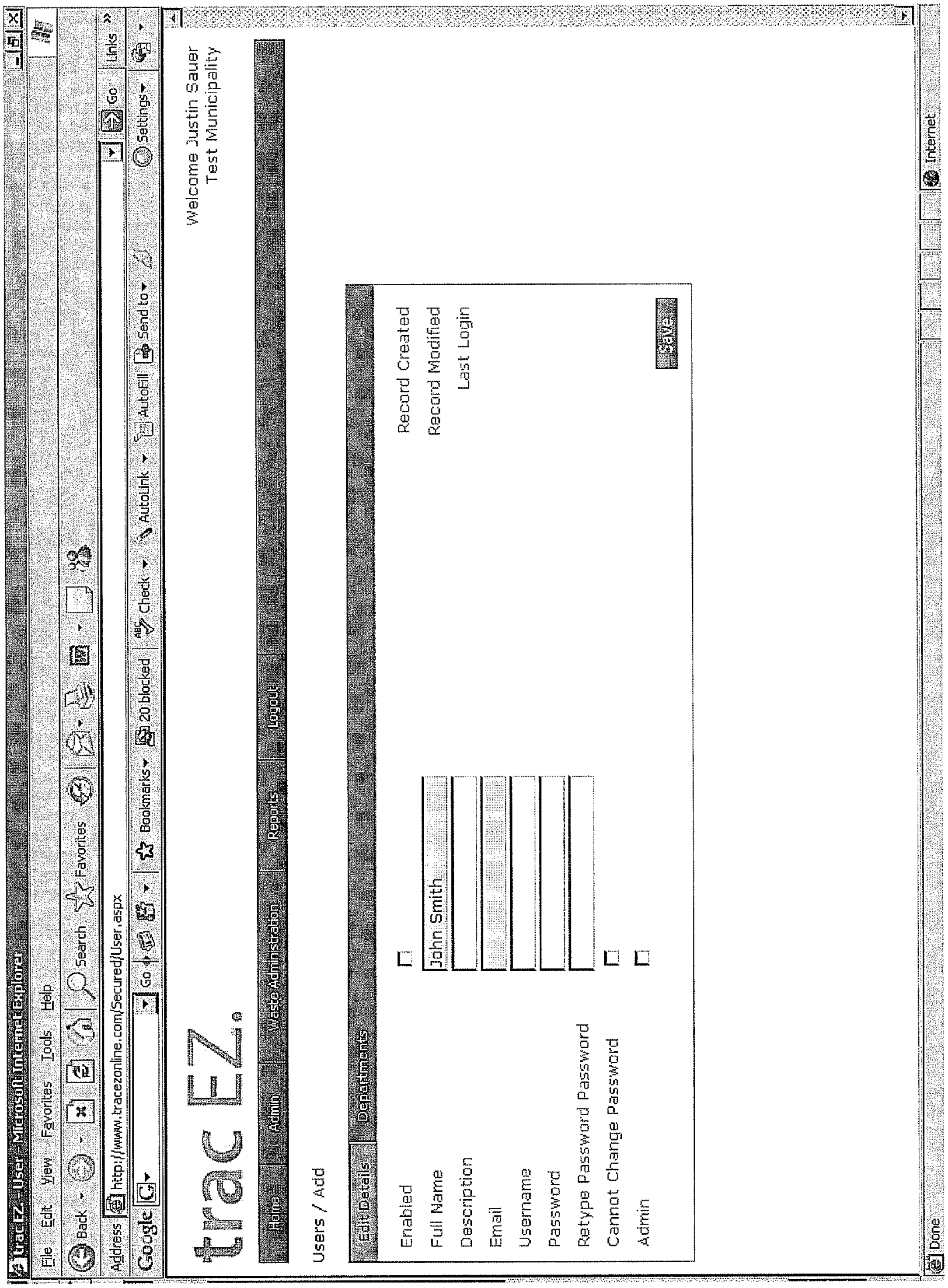

Under the "Admin" drop down menu, the user is further presented with selections to "Add" or "Edit" municipality-associated users. Referring to FIG. 5, upon selecting "Add", the user is presented with a user information form having fields to enter information about a new user to be added, such as email, username and password information. Additionally, the user can select to enable the new user's access, and grant the new user permissions, such as permission to change their password and, administrative permission. Users added through the municipality interface submodule are automatically associated with the corresponding municipality. The new user can also be associated with a department of the municipality. Upon saving the information, the new user is added to the users database.

Figure 6:
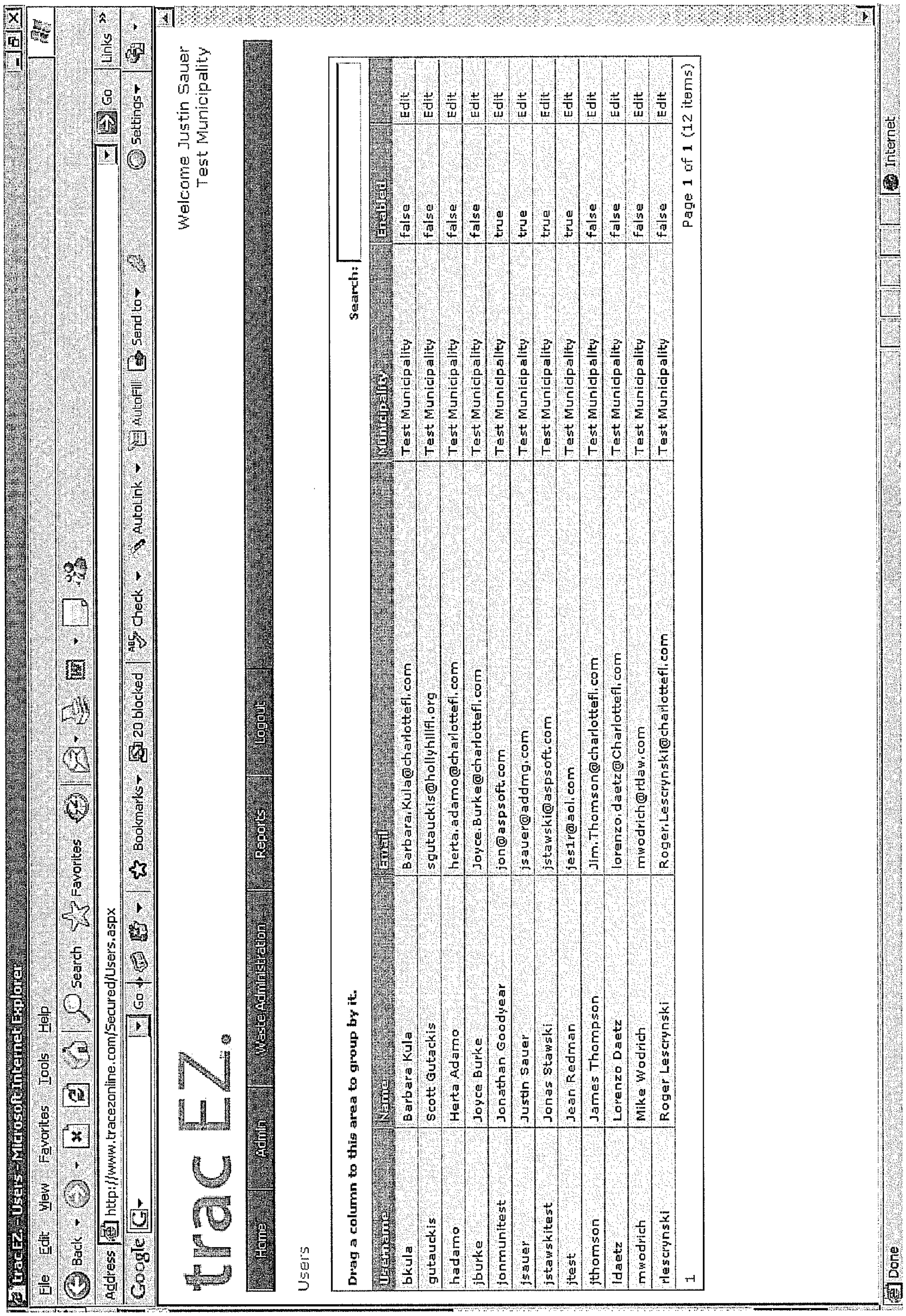

Referring to FIG. 6, upon selecting "Edit", the user is presented with a list of municipality-associated users. Because the user is associated with only one municipality, the list of municipality-associated users only includes those other users in the users database associated with the user's municipality. The user can enter search information to help locate a particular user on the list. A further "Edit" selection is associated with each user on the list, allowing that user's information to be reviewed and changed.

Figure 7:
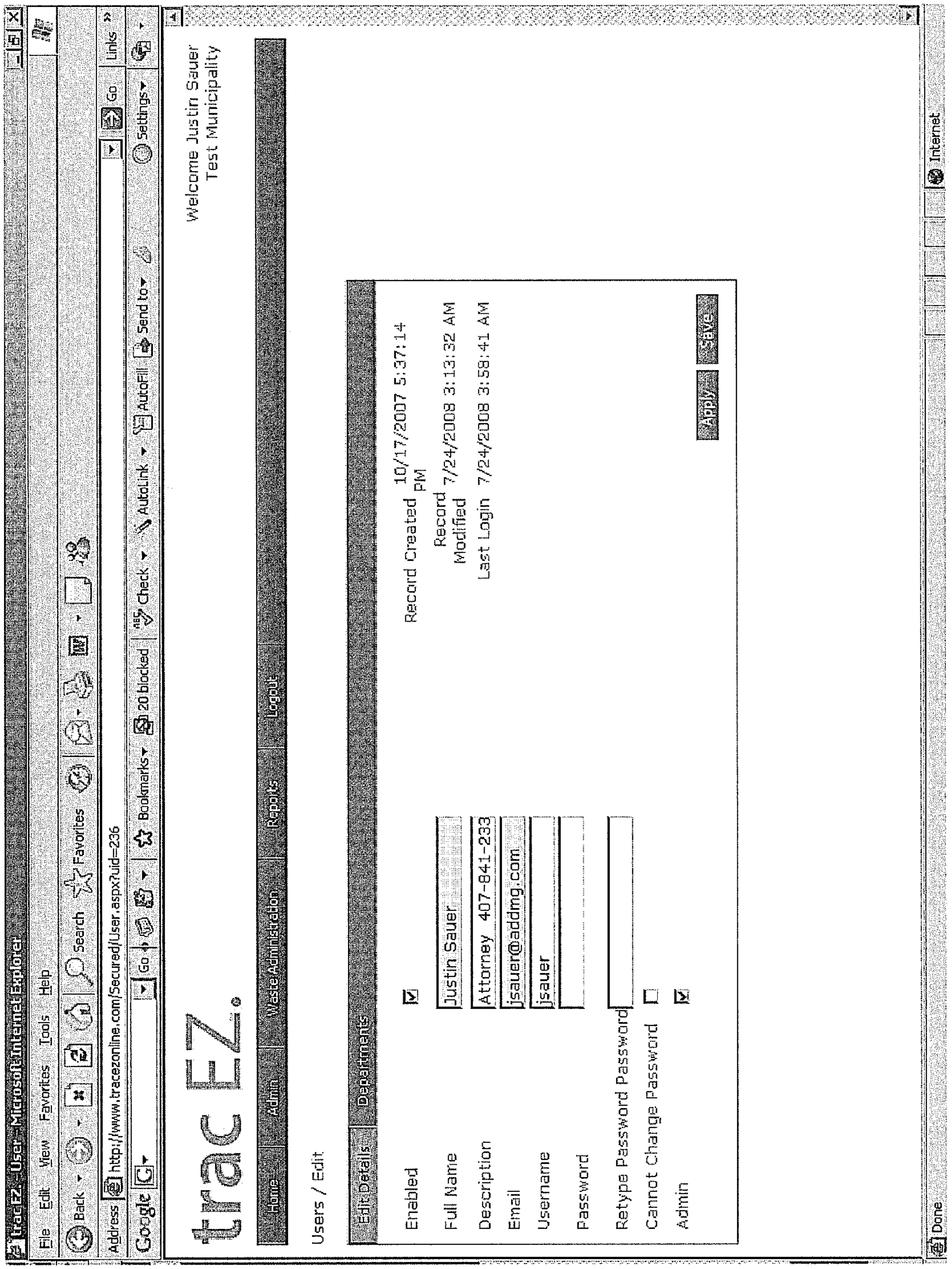
Figure 8:
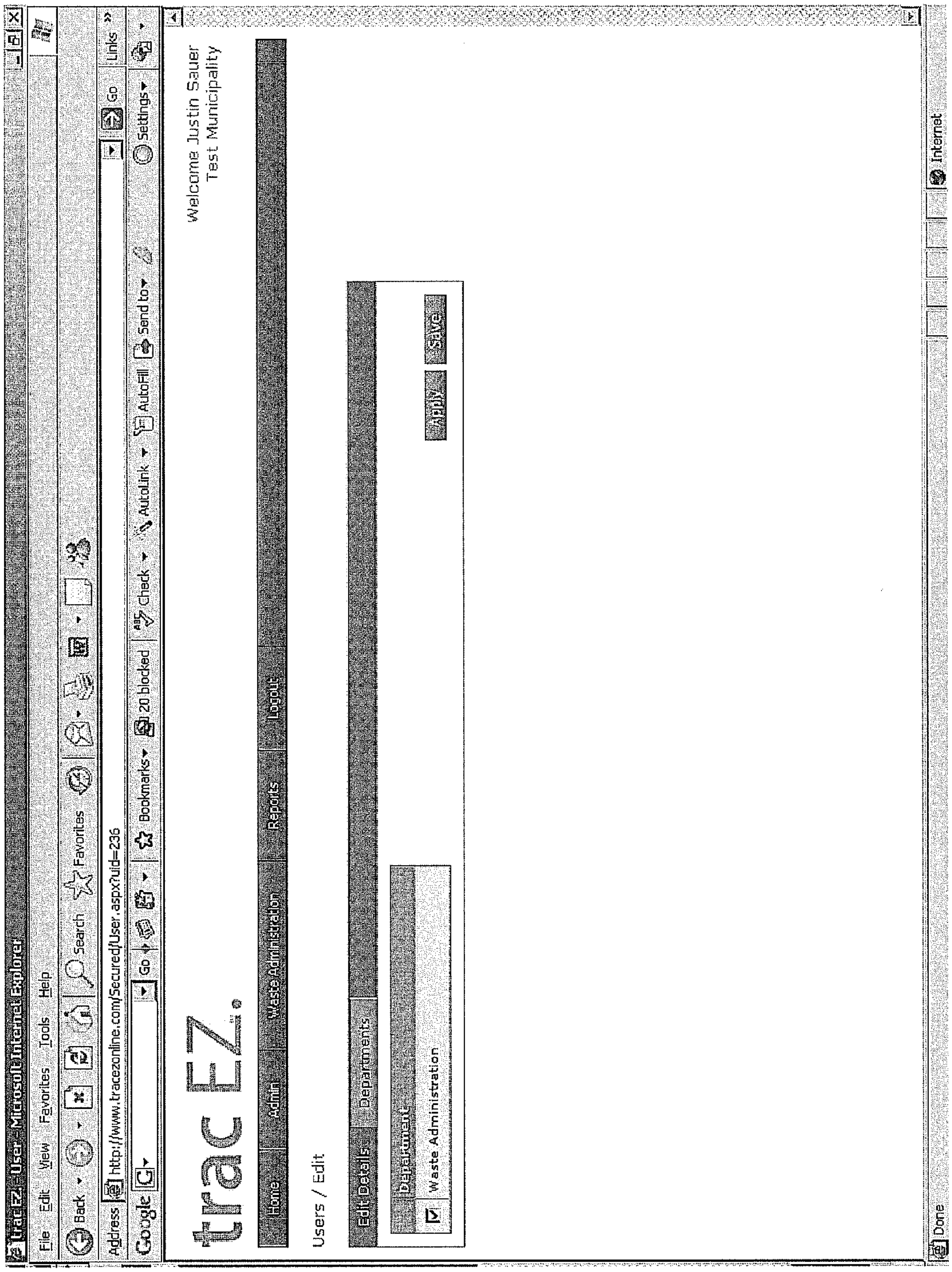

Referring to FIG. 7, upon selecting an "Edit" selection associated with a particular user on the list, that user's user information form is displayed and can be edited. Similarly, referring to FIG. 8, the departmental associations can be selected for the user. Selection of a departmental association can be used to further determine the drop down menus presented to the user. For example, if the "Waste Administration" association were not selected, then the user would not be presented with the corresponding drop down menu. When saved, the edited information is stored in the users database.

Figure 9:
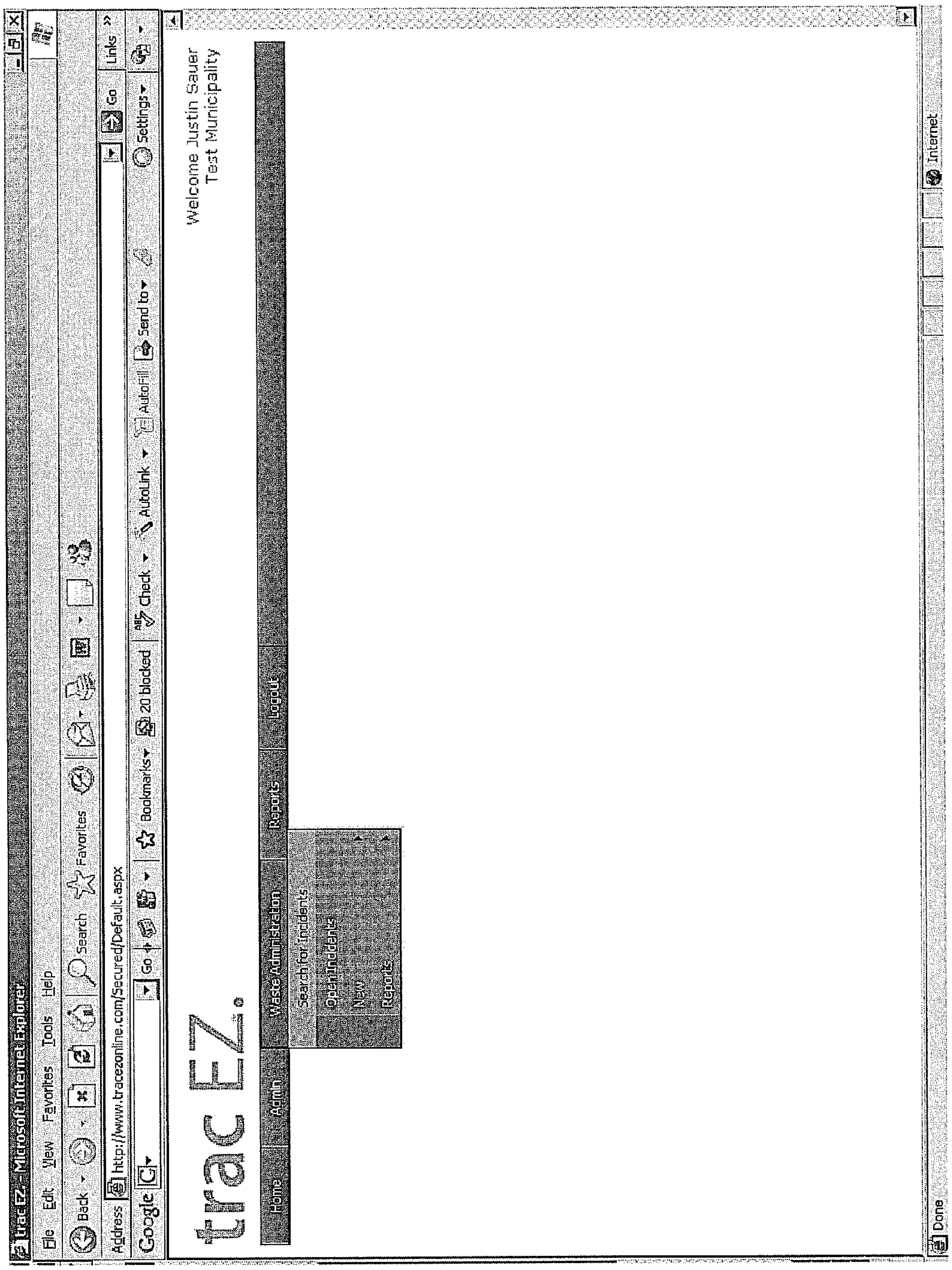
Figure 10:
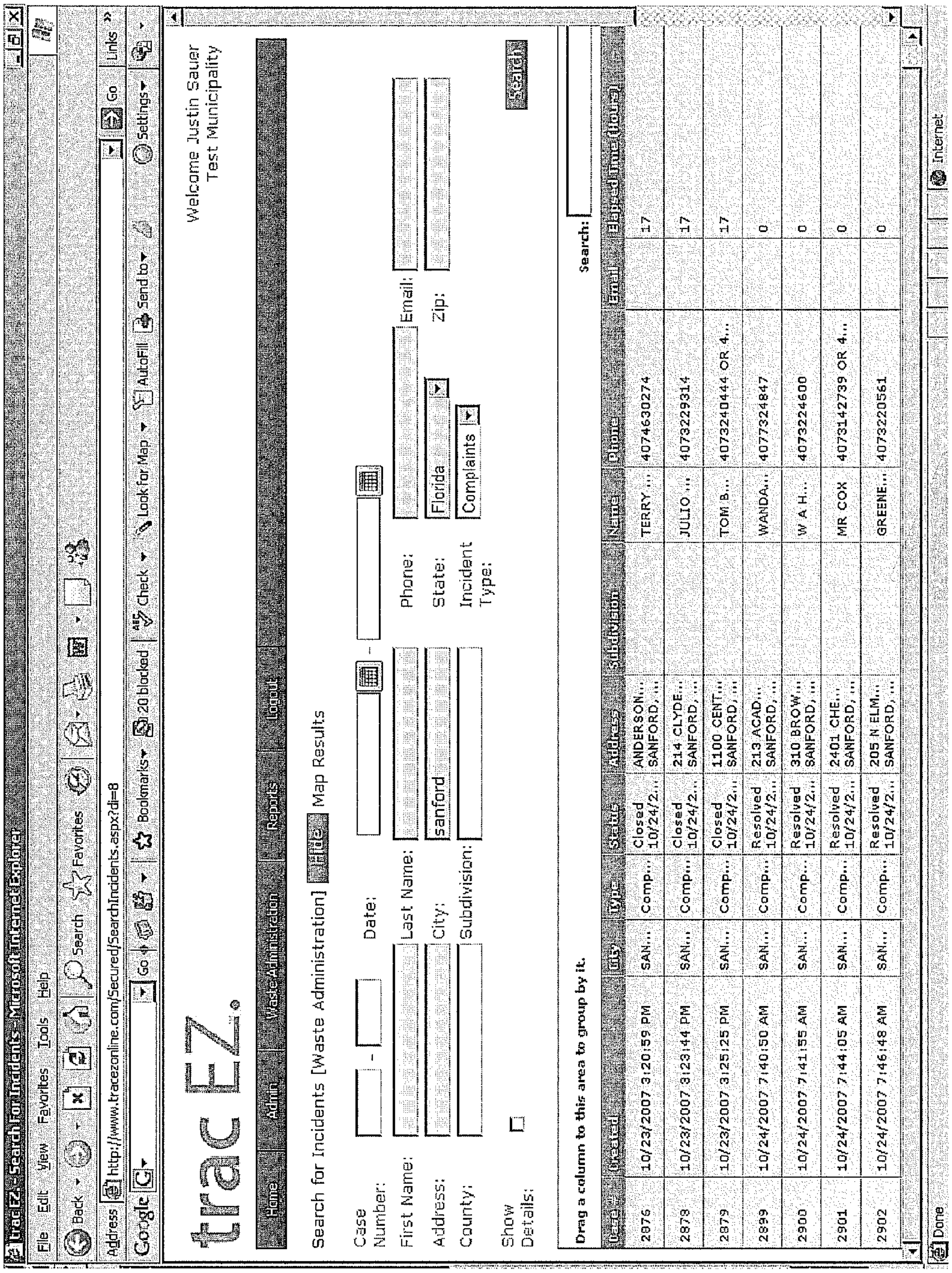

Referring to FIG. 9, under the "Waste Administration" drop down menu, the user is further presented with "Search for Incidents", "Open Incidents" "New" and "Reports" selections. Referring to FIG. 10, upon selecting "Search for Incidents", the user is presented with a search form having a plurality of search criteria that can be specified. Selecting search will search the complaints, requests and/or compliments databases for all complaints, requests and/or compliments associated with the user's municipality that satisfy the search criteria.

Figure 11:
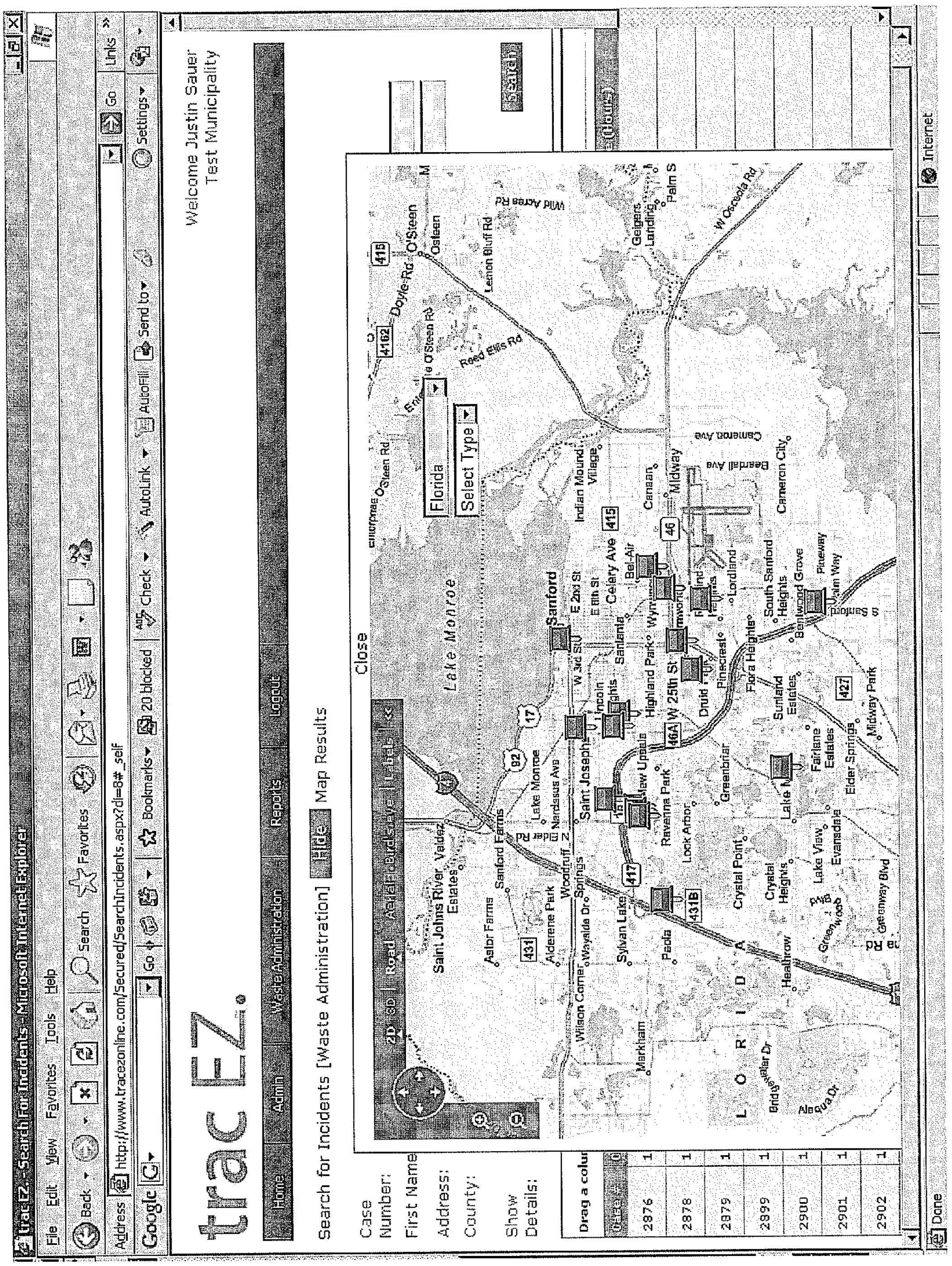

Search results are displayed in a list below the search criteria. More detailed information about each result can be displayed in the list if "Show Details" is selected prior to requesting the search. Referring to FIG. 11, by selecting "Map Results", locations of search results having valid addresses are displayed to the user in a map format.

Figure 12:
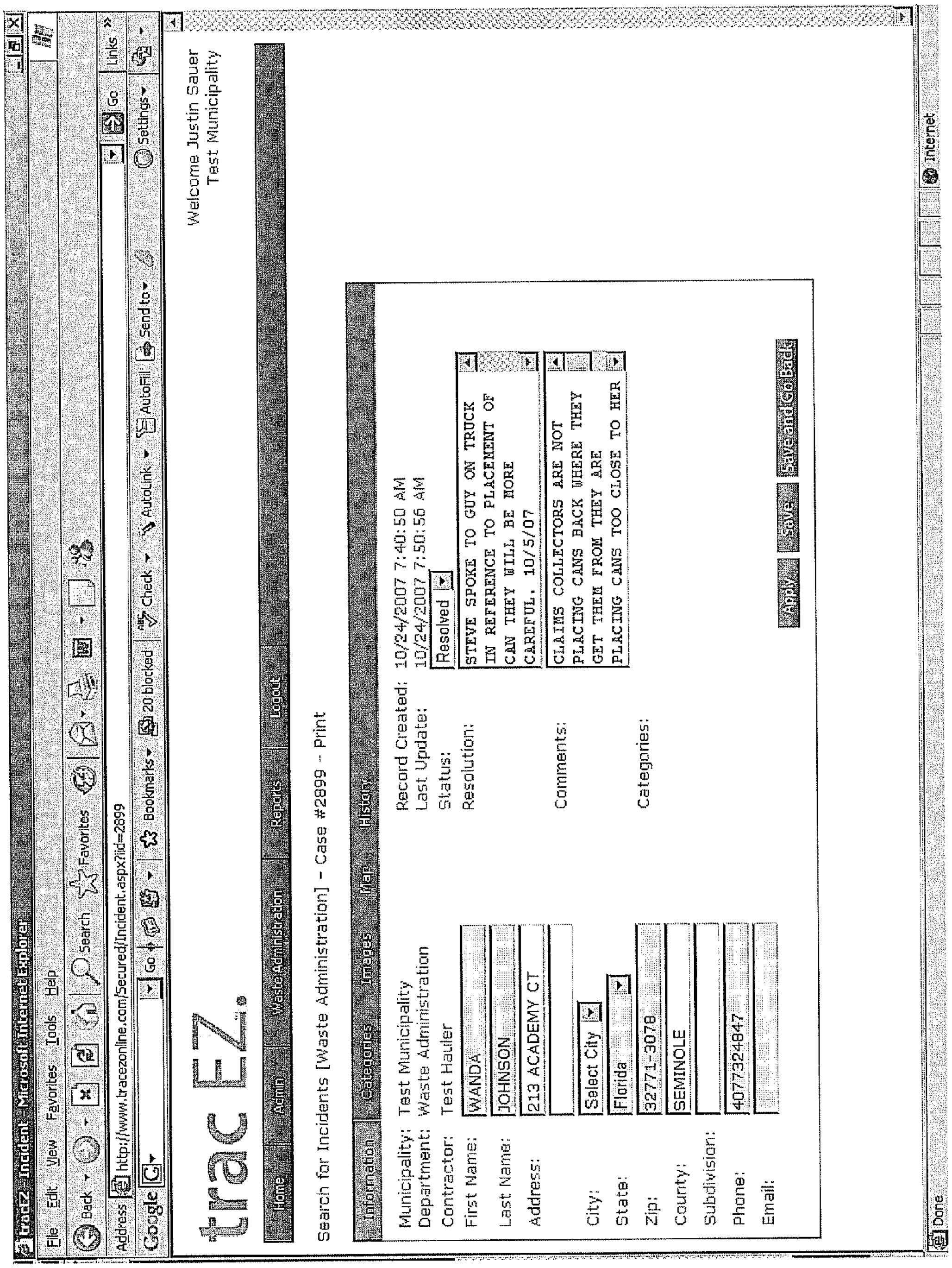

Referring to FIG. 12, an incident form showing detailed information about a given incident is displayed upon selection of the "Case #" associated with the incident (see FIG. 10). The user can edit some of the information (e.g, to correct an invalid address, or to clarify comments), can update a status of the incident using a selection box, and can indicate a resolution of the incident. If the individual who generated the incident provided a valid email address, an email to the individual indicating the resolution of the incident will be automatically generated and transmitted. Changes to the incident are saved in the corresponding database.

Figure 13:
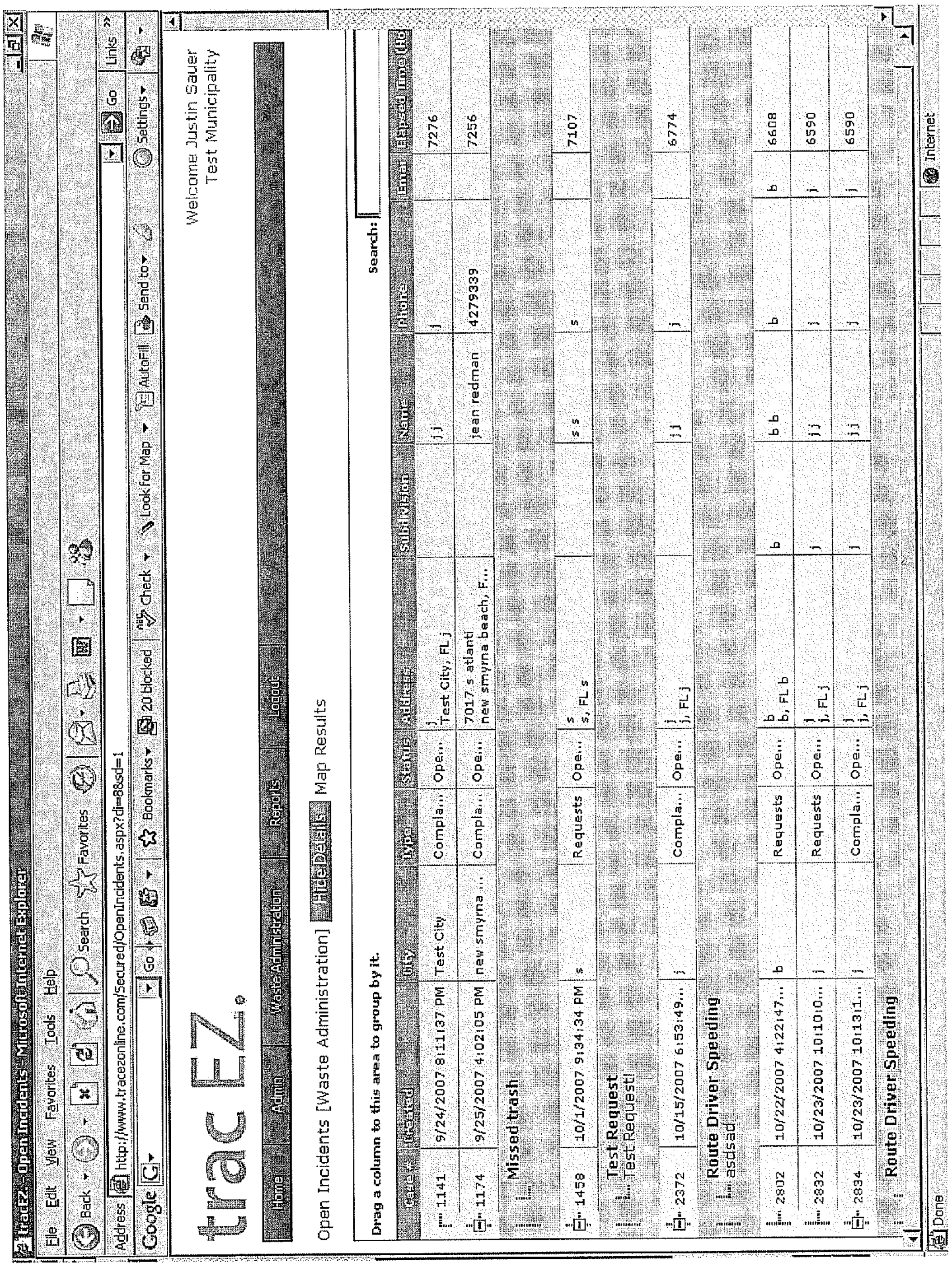

Referring to FIG. 13, upon selection of "Open Incidents" from the "Waste Administration" drop down menu (see FIG. 9), the user is presented with a list of incidents that have not been closed, cancelled or resolved. In FIG. 13, the list is shown with additional details, which can be hidden. As with the search results, a particular incident can be selected by selecting the associated "Case #". Additionally, a search box is displayed, allowing the user to enter search terms to narrow the list of open incidents. It will be further noted that an elapsed number of hours that the incident remained open is also displayed for each incident.

Figure 14:
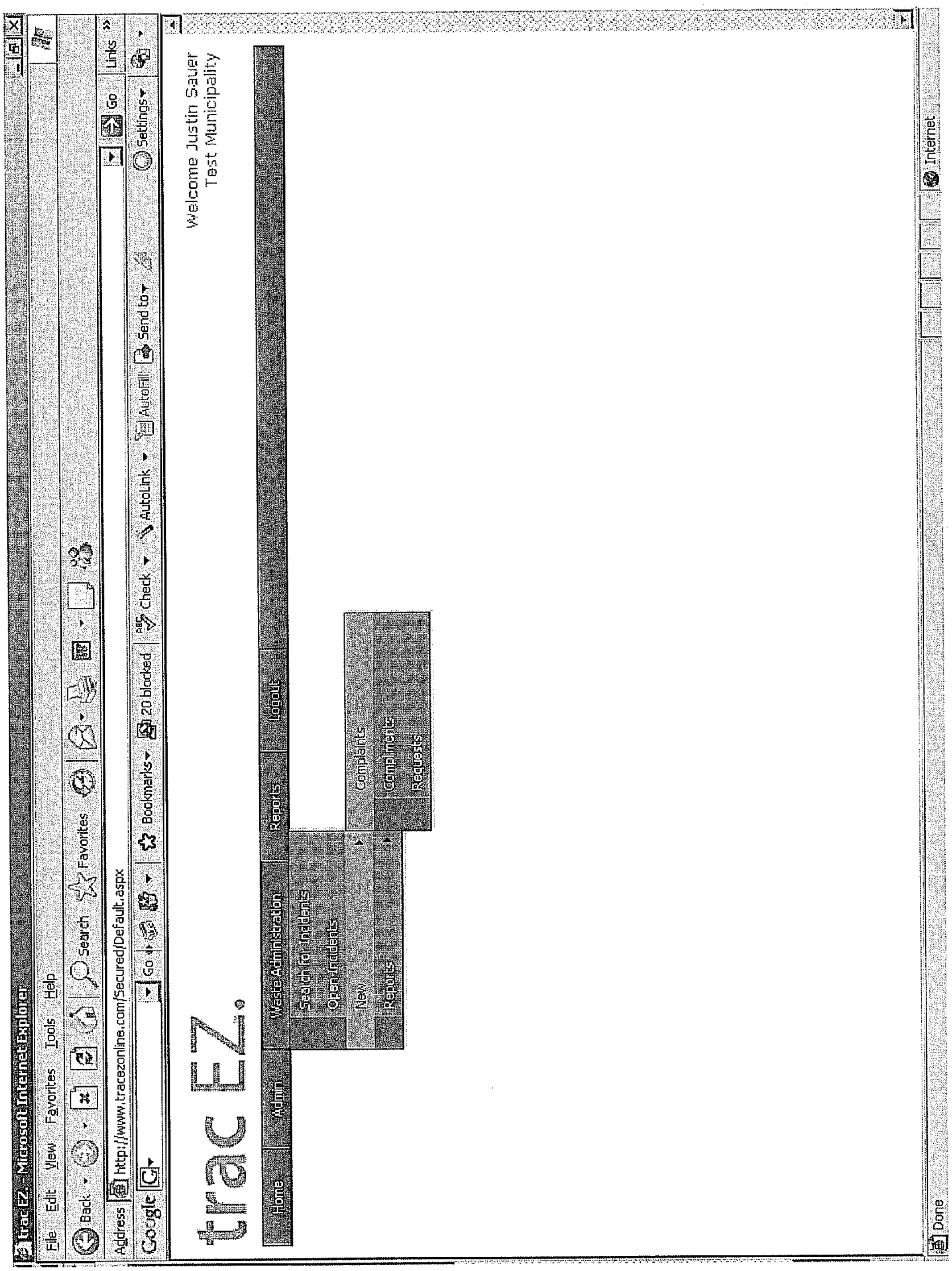

Referring to FIG. 14, upon selecting "New" from the "Waste Administration" drop down menu, the user is further presented with selection to enter "Complaints", "Compliments" or "Requests". The system also allows contract beneficiaries, such as local residents or businesses, to enter incidents directly (as will be described further below).

Figure 15:
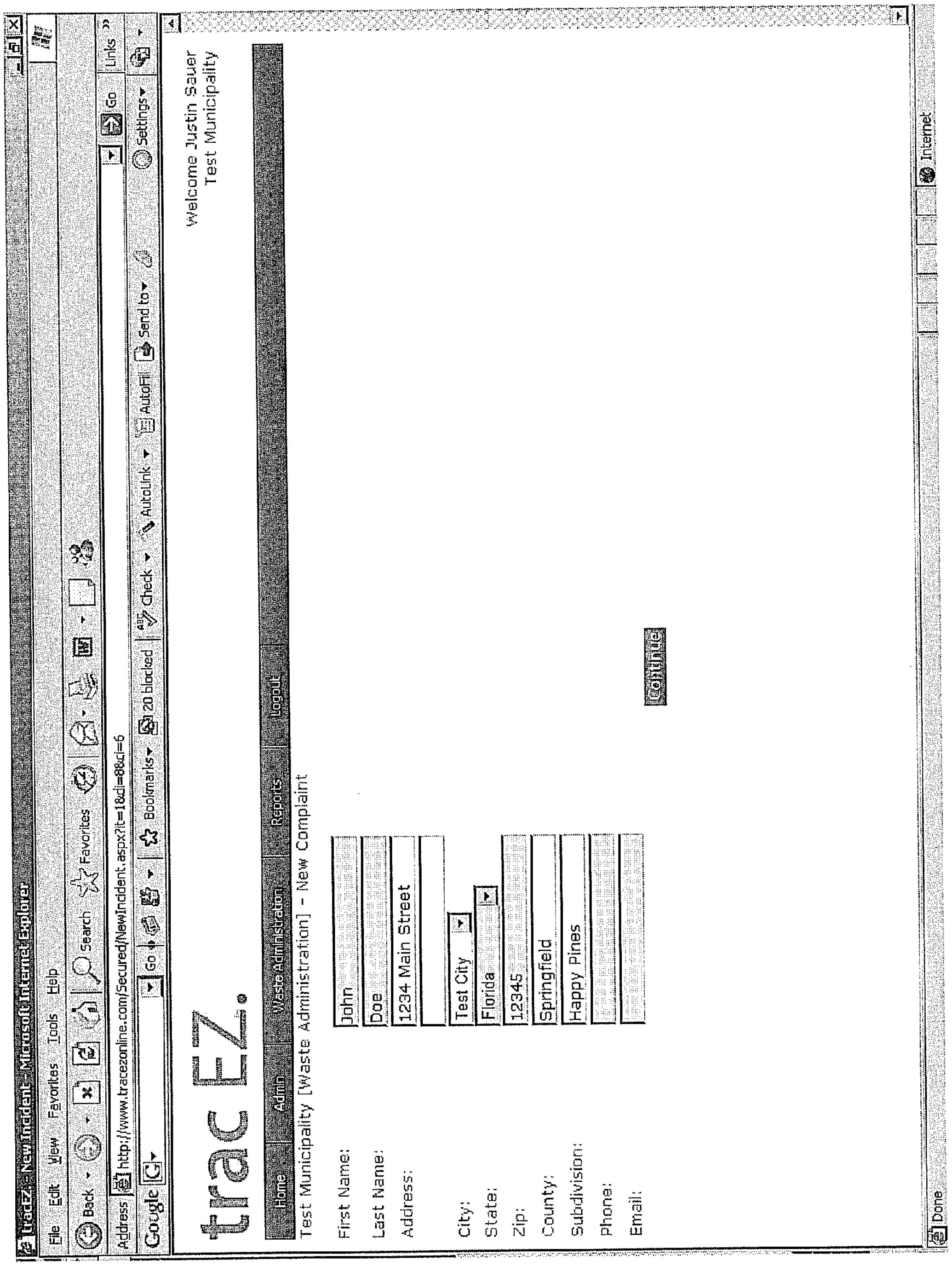

Referring to FIG. 15, upon selecting "Complaints" a first complaint form is displayed, allowing the user to enter identifying information about the initiator of the complaint, such as name, address, telephone number and email address. Upon selecting "Continue", the entered address is checked to verify it is an actual address. If the address cannot be verified, the user is given the option to proceed anyway.

Figure 16:
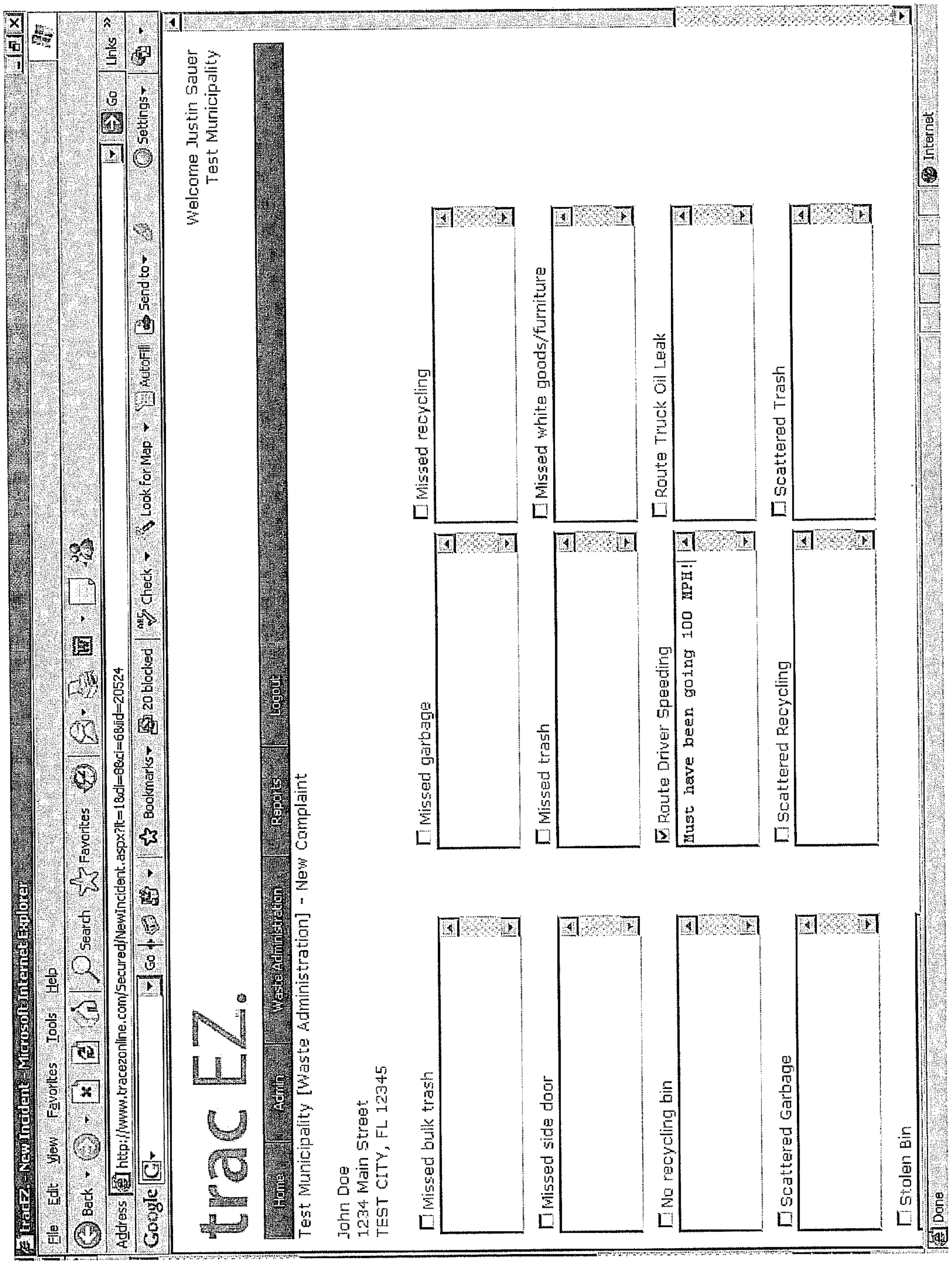
Figure 17:
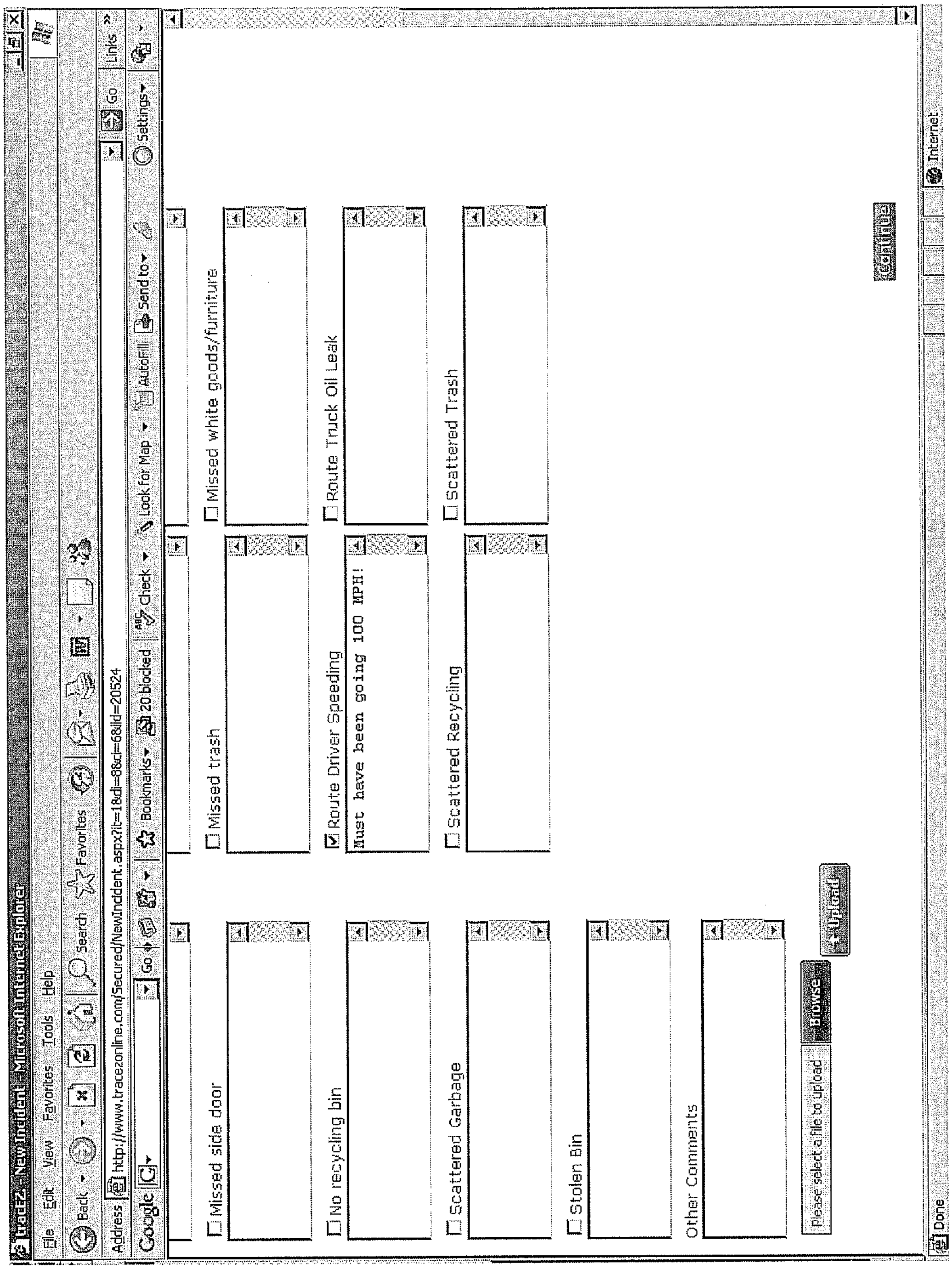

Referring to FIGS. 16 and 17, a second complaint form is then displayed to the user. The second complaint form includes comment boxes relating to pre-entered complaint categories that can be selected by the user, as appropriate. If none of the complaint categories are appropriate, the user can also enter other comments. Additionally, the user is enabled to upload files, such as pictures substantiating the complaint, to accompany the complaint. Upon selecting "Continue" again, the complaint is submitted and saved to the complaint database.

Figure 18:
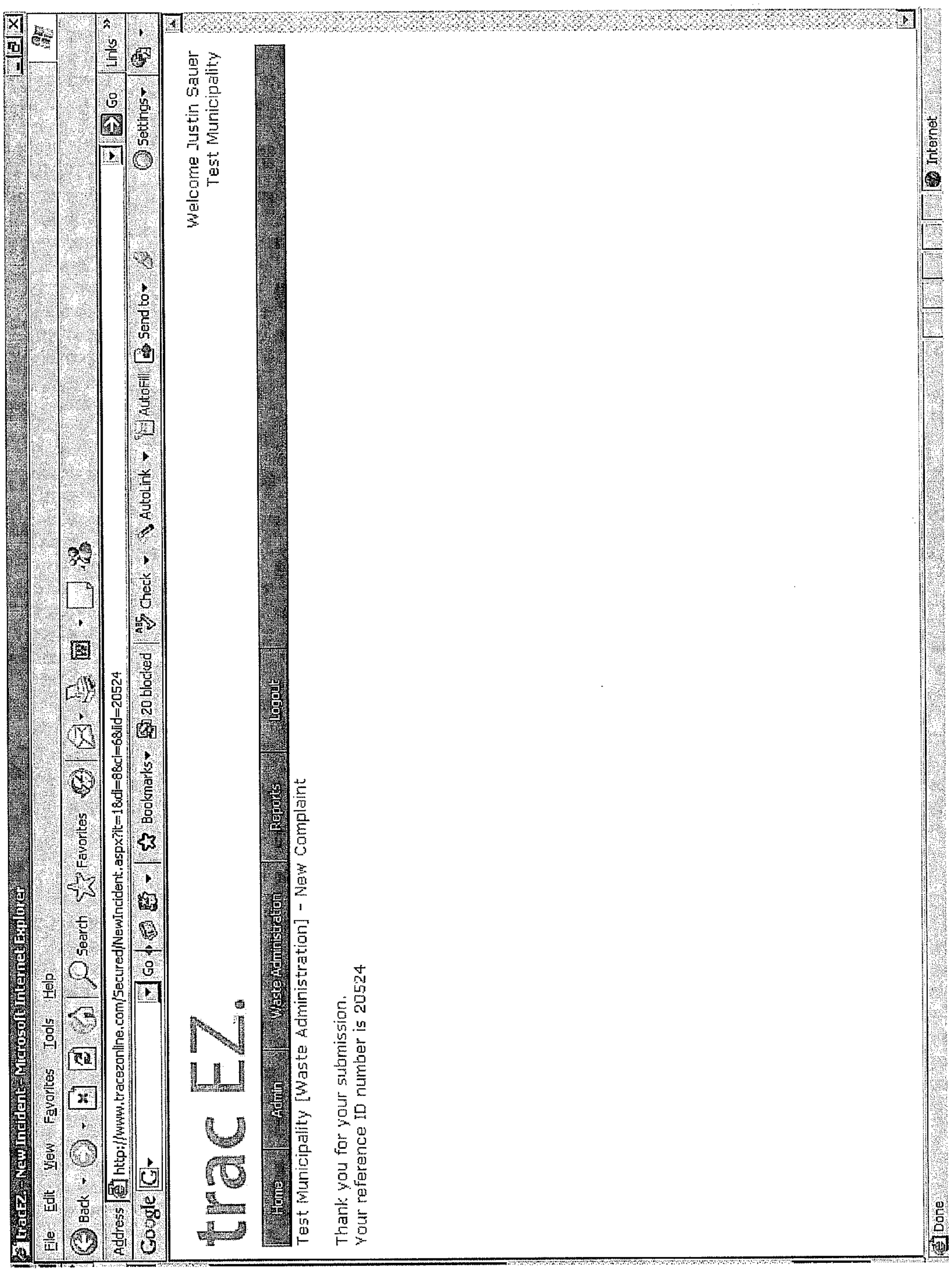

Referring to FIG. 18, the user is given an "ID Number", corresponding to the "Case #" (see FIGS. 10 and 13). If the user provides a valid email address, an email confirmation of the complaint's submission is automatically generated and sent to the email address. Additionally, email notification of the new complaint is automatically generated and sent to selected users associated with the municipality and the corresponding garbage hauler.

Figure 19:
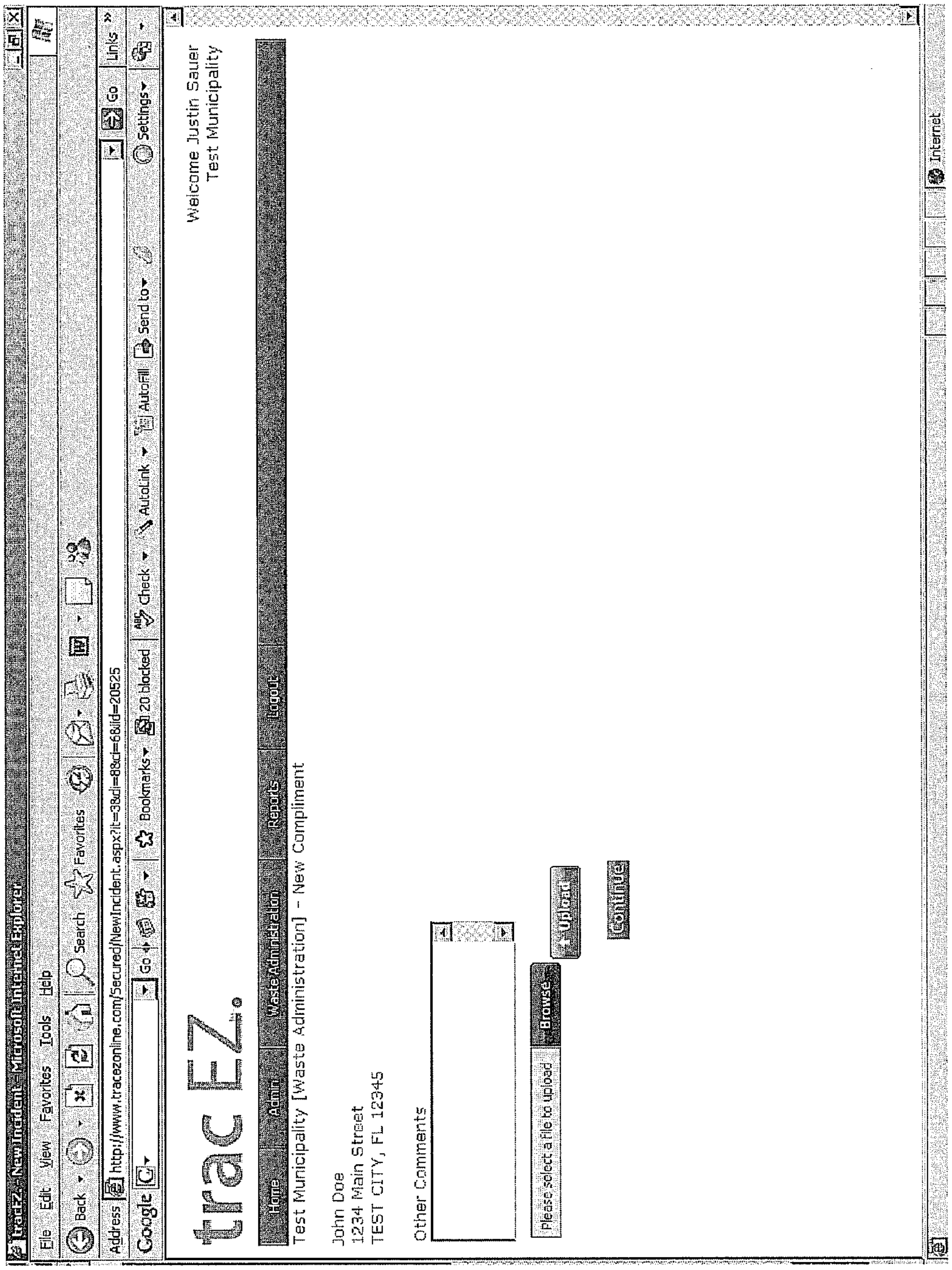

Upon selecting "Compliment" (see FIG. 14), a first compliment form, substantially similar to the first complaint form (see FIG. 15) is displayed for entry of information concerning the initiator of the compliment. Referring to FIG. 19, after entering the identifying information, a second compliment form is displayed allowing the user to enter comments about the compliment and to upload related files. After continuing, the compliment is saved to the compliments database, and email confirmation and notifications are generated and sent as with the complaints.

Figure 20:

Selecting "Request" (see FIG. 14) also results in the display of a first request form substantially similar to the first complaint form. Referring to FIG. 20, the second request form, similarly to the second complaint and compliment forms, allows entry of comments and uploading of files related to the request. As with the second complaint form, pre-entered requests categories (e.g., extra pick-up, yard waste pickup or hazmat pickup) can appear on the form for user selection and comment. After continuing, the request is saved to the requests database, and email confirmation and notifications are generated and sent as with the complaints and compliments.

Figure 21:
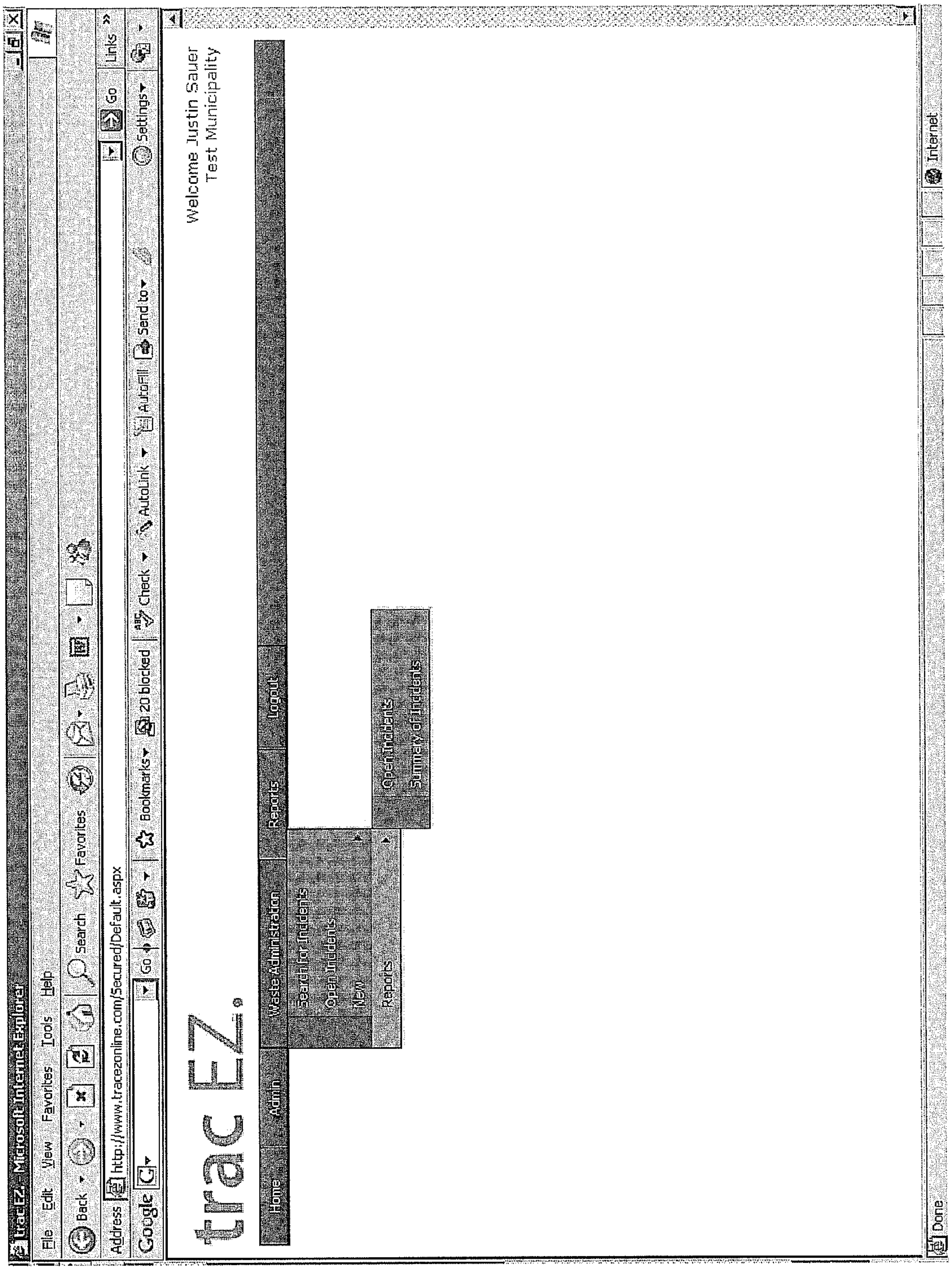
Figure 22:
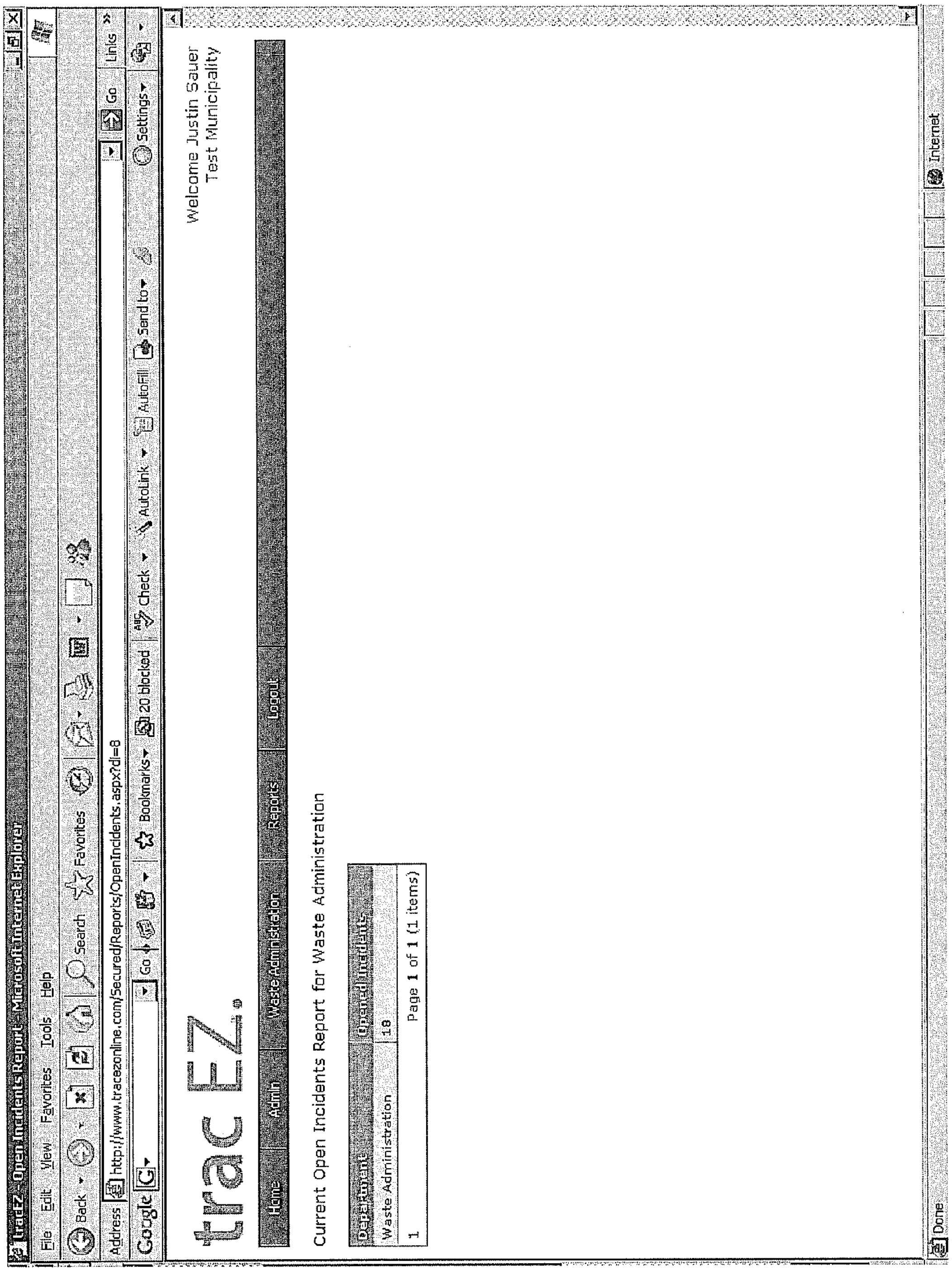

Referring to FIG. 21, selecting "Reports" from the "Waste Administration" drop down menu results in the display of further selections "Open Incidents" and "Summary of Incidents". Referring to FIG. 22, selecting "Open Incidents"

results in the display of report indicating the total number of incidents open within the Waste Administration department.

Figure 23:
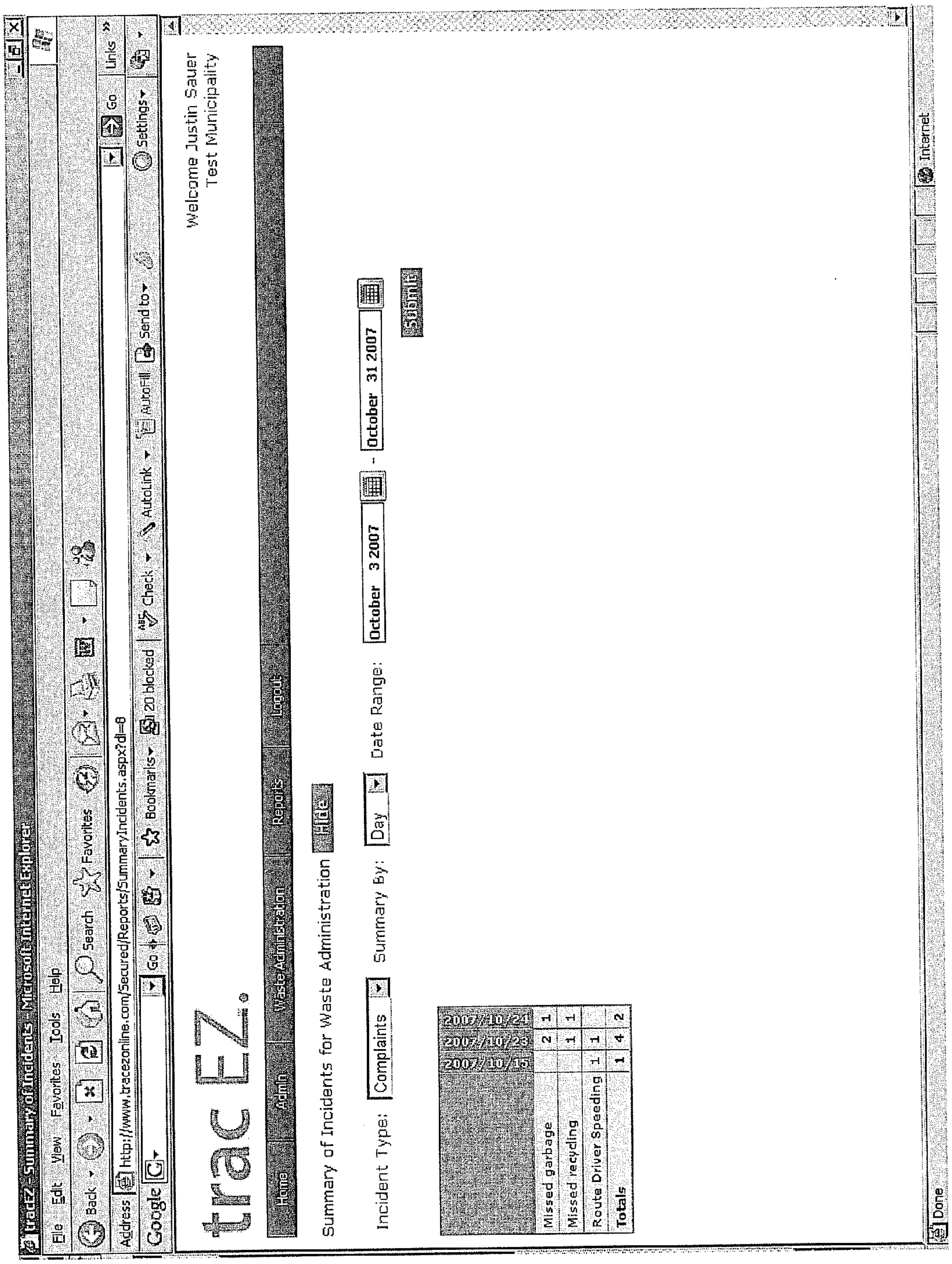
Figure 24:
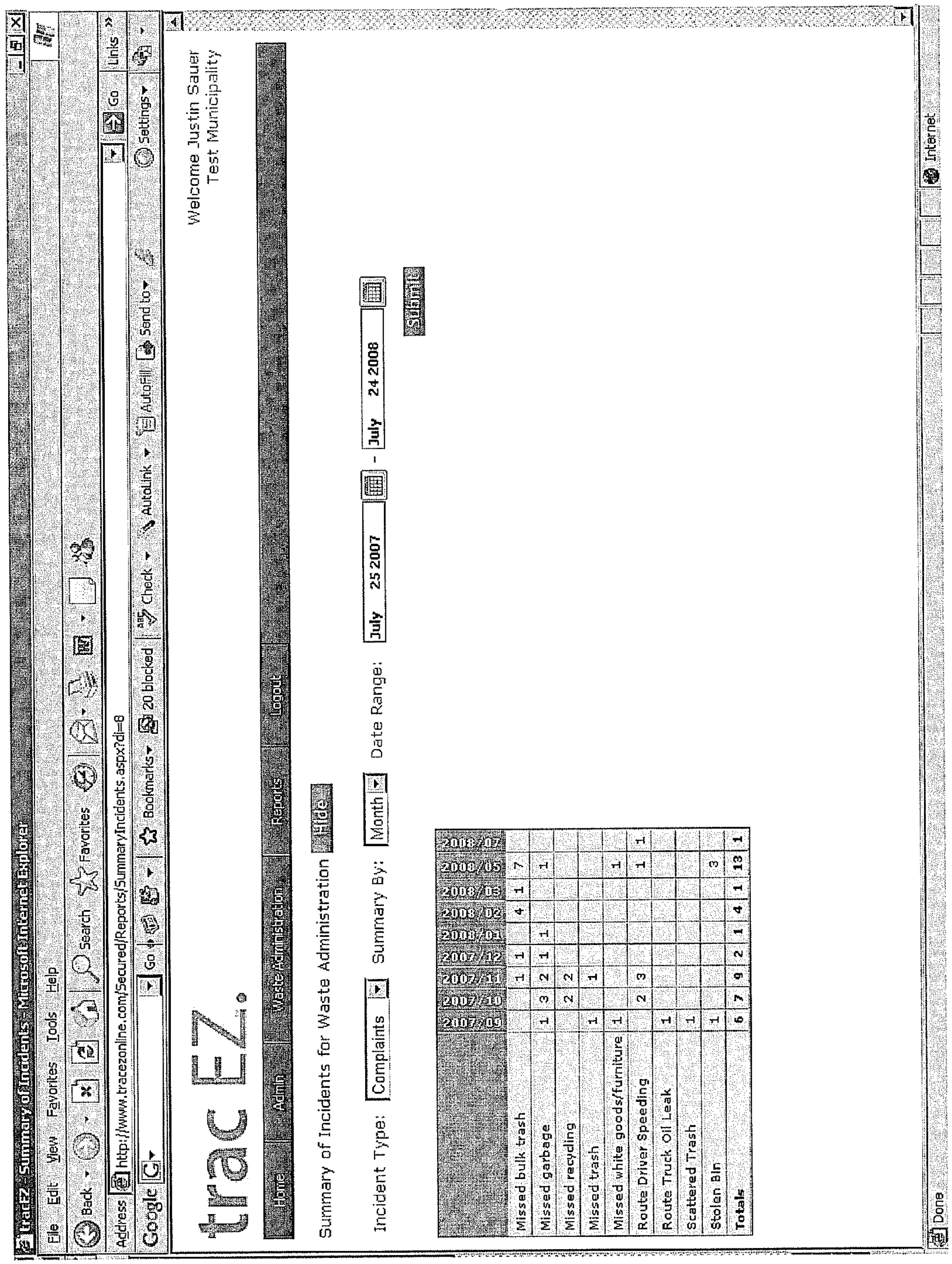

Referring to FIGS. 23 and 24, selecting "Summary of Incidents" results in the display of a summary customization form, permitting various summary criteria to be specified. The periodicity of the summary is included among the summary criteria that can be specified. Using a selection box, the periodicity can be specified as daily, weekly, monthly or yearly. Upon submission of the summary criteria, the corresponding databases are searched to provide summary data for the municipality pursuant to the summary criteria. In FIG. 23, a report summarizing the number and type of complaints received by the Waste Administration department by day during a selected time period is shown. In FIG. 24, a report summarizing the number and type of complaints received by the Waste Administration department by month during a selected time period is shown.

Selecting the "Reports" drop down menu (rather than selecting "Reports" under the "Waste Administration" drop down menu) also allows the selection of "Open Incidents" and "Summary of Incidents", with substantially similar functionality. However, in the event there is more than one department associated with the municipality, reports generated under the "Reports" drop down menu can include summary information for all such departments.

Figure 25:
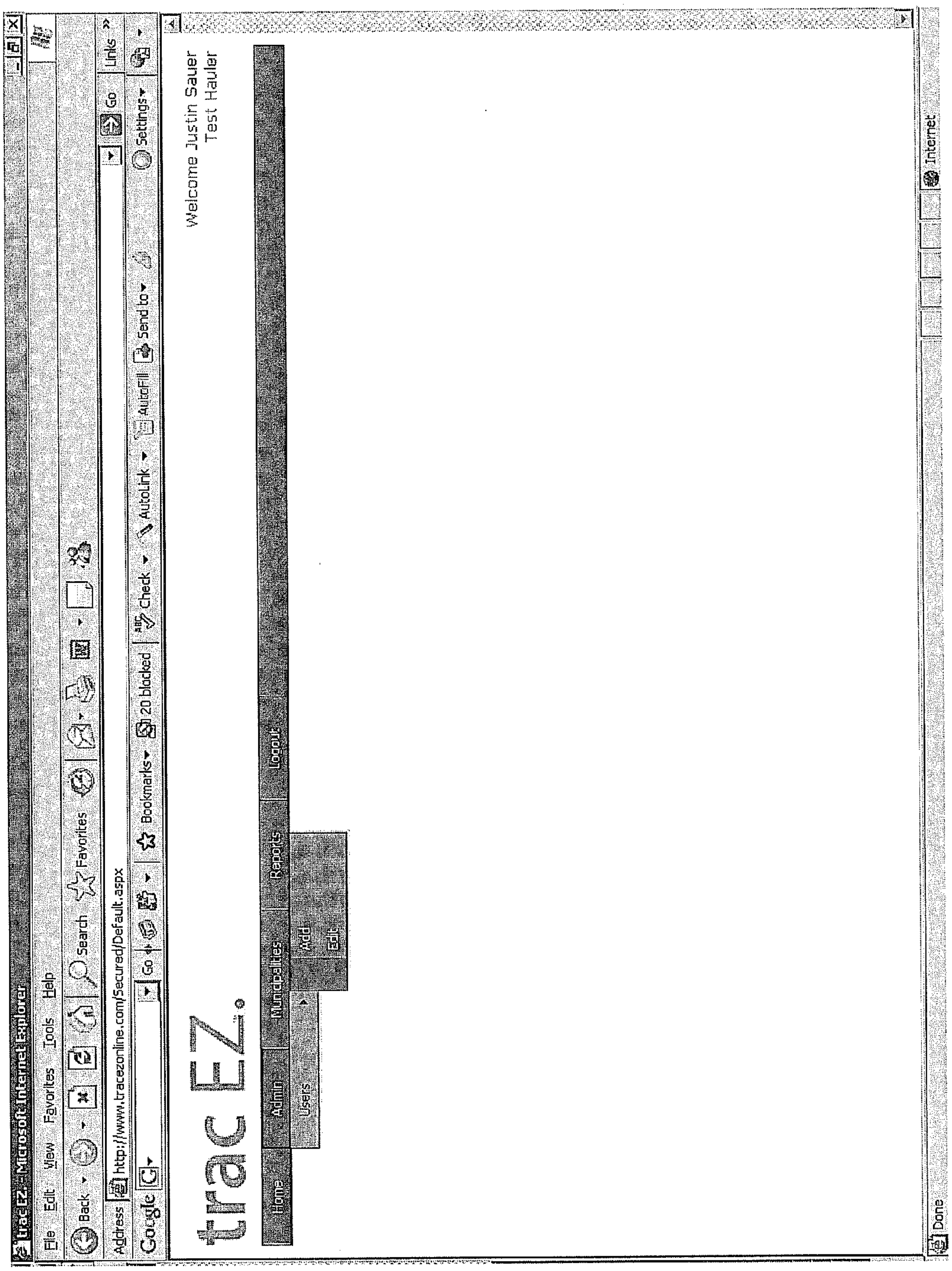
FIGS. 25 and 26 are screens associated with operations of a garbage hauler interface submodule of the interface module of FIG. 2.
Figure 26:
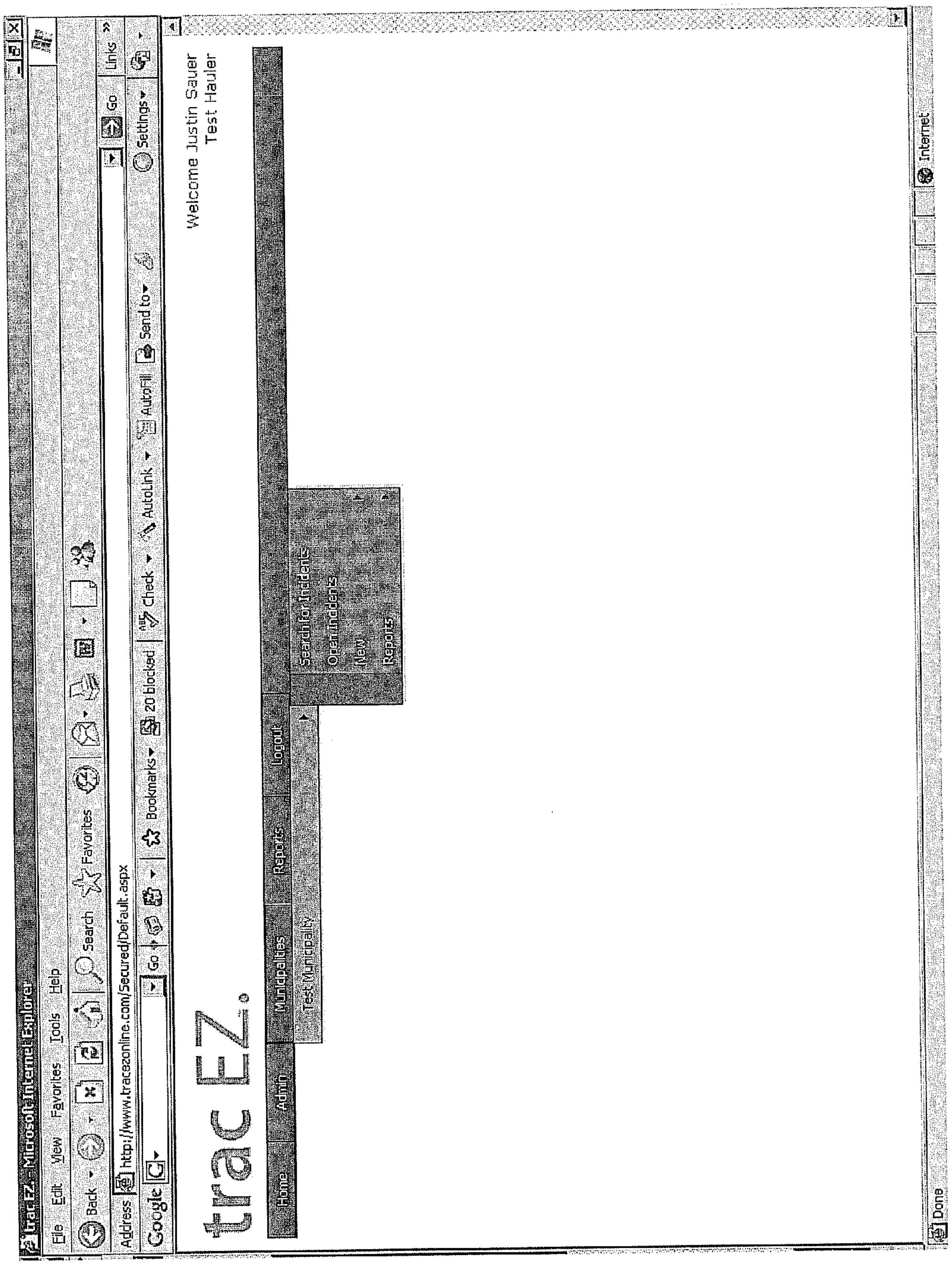

With reference to FIGS. 25 and 26, operation and features of the garbage hauler interface submodule are described. Upon login of a user associated with a garbage hauler, a garbage hauler "Home" screen is displayed. "Admin", "Municipalities" and "Reports" drop down menus are presented, along with a "Home" selection and "Logout" selection. The "Admin" dropdown menu allows the garbage hauler associated user (with admin permission) to add or edit users associated with that garbage hauler, in a manner substantially similar to the related functions described in connection with the municipality interface submodule.

The "Municipalities" drop down menu allows the user to select among municipalities associated with the user. In the example of FIG. 26, only one municipality is associated with the garbage hauler. However, it should be appreciated that a given garbage hauler could provide services to a plurality of municipalities, in which case a plurality of municipalities would be available for selection on the "Municipalities" drop down menu.

Upon selection of a given municipality, further selections of "Search for Incidents", "Open Incidents" "New" and "Reports" are displayed. The operation of these selections is substantially the same as the related selections described in connection with the "Garbage Administration" drop down menu of the municipality interface submodule. Additionally, selection of the "Reports" drop down menu is similar to the selection of "Reports" under the "Municipalities" drop down menu, except that reports including all municipalities associated with a given garbage hauler can be generated.

Figure 27:
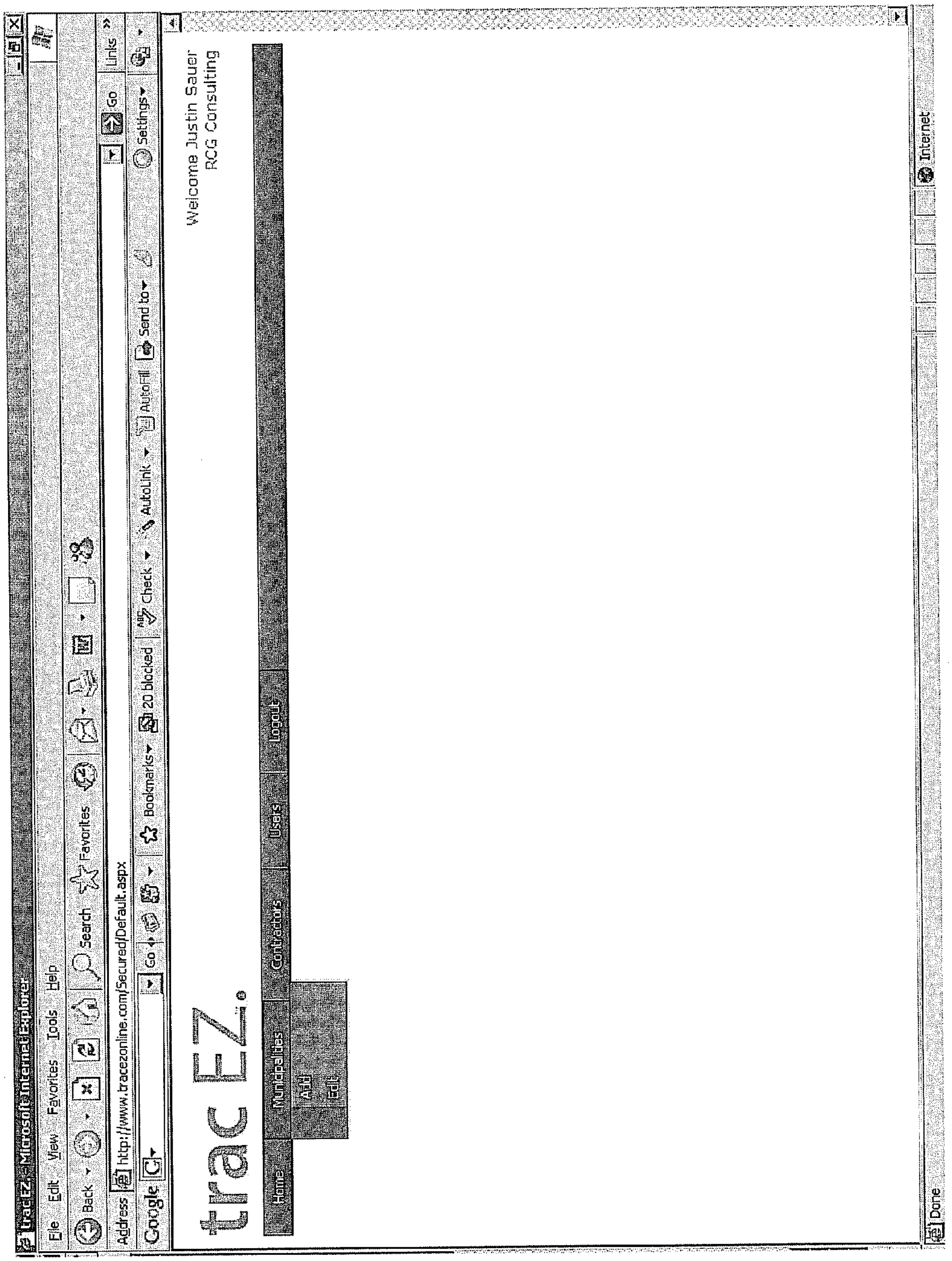

With reference to FIGS. 27-37, operation and features of the system administration interface submodule are described. Referring to FIG. 27, upon login of a system administration-associated user, a system administration "Home" screen is displayed, with a plurality of drop down menus. For example, "Municipalities", "Contractors" and "Users" drop down menus are displayed, as well as "Home" and "Logout" selections.

Figure 28:
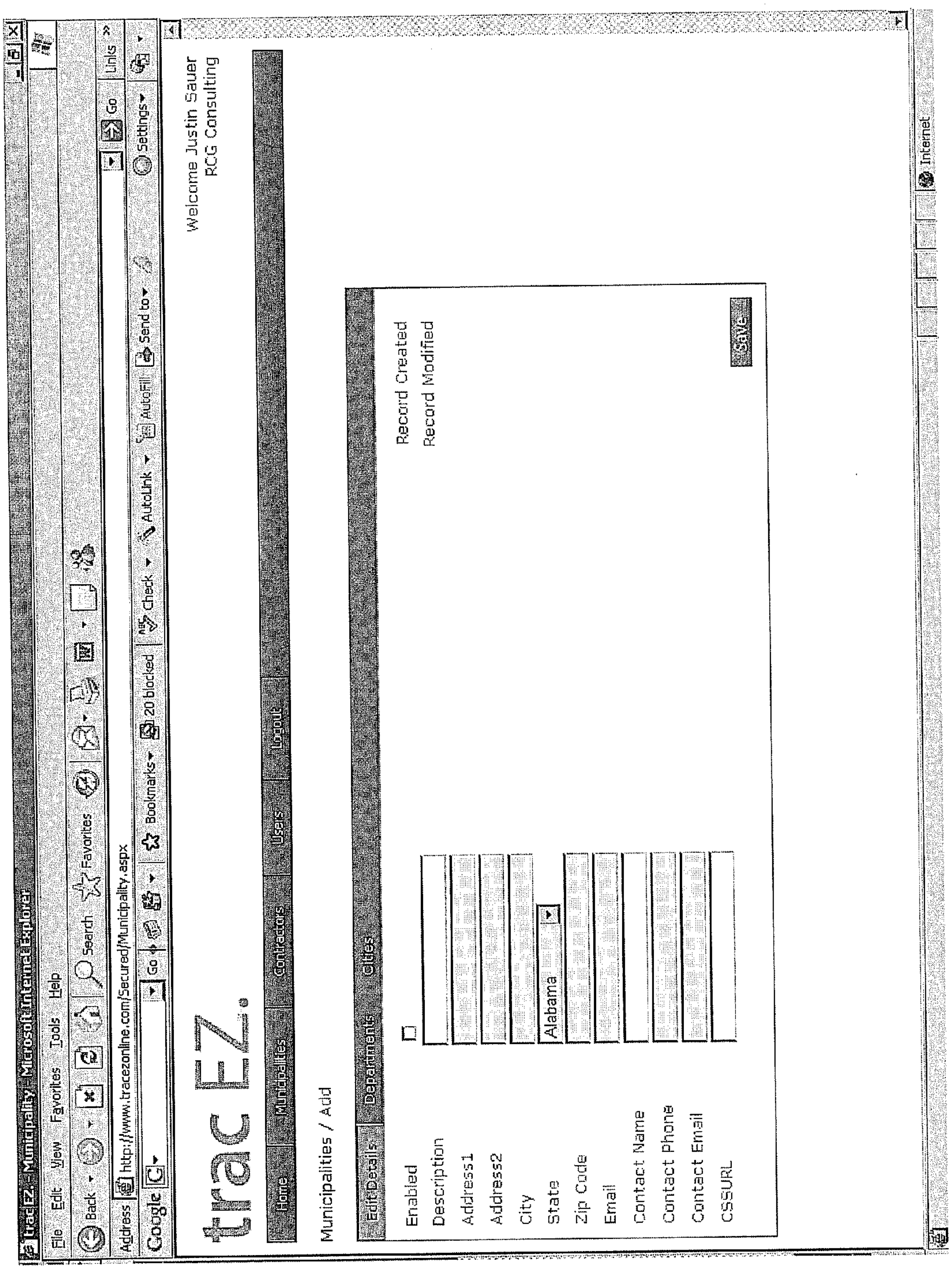

Selecting the "Municipalities" drop down menu allows the user to "Add" or "Edit" municipalities. Referring to FIG. 28, upon selection of "Add", a municipality information form is displayed. Identifying information about the municipality can be entered into the form. Contact information can also be entered to specify the email address to which email notifications concerning the municipality are to be addressed. By selecting "Departments" and "Cities", the user can add departments (e.g., garbage administration, animal control, and others) and cities (for example, where one municipal or other government is responsible for providing servers to multiple cities or towns) associated with the municipality.

Figure 30:
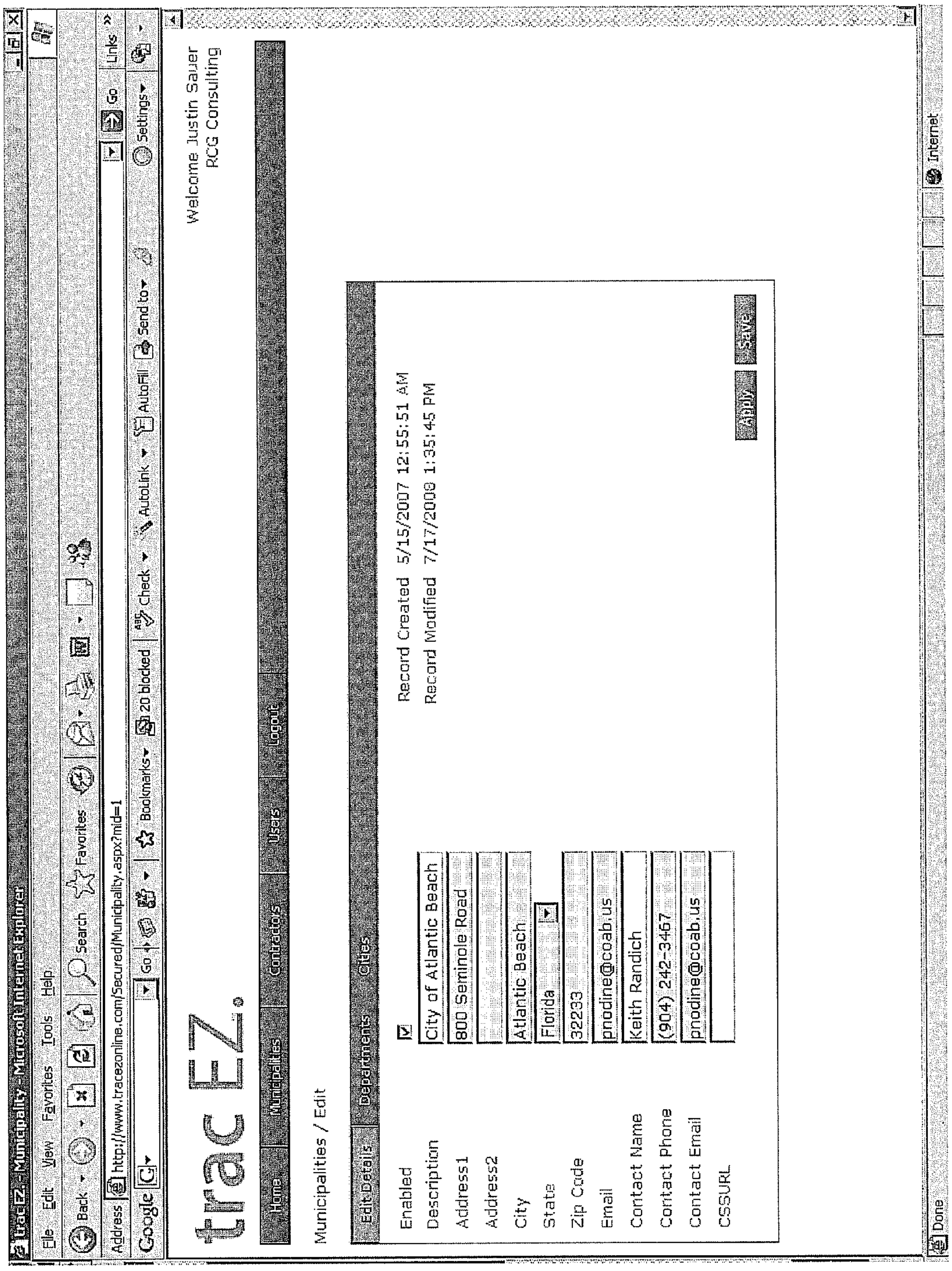
Figure 31:
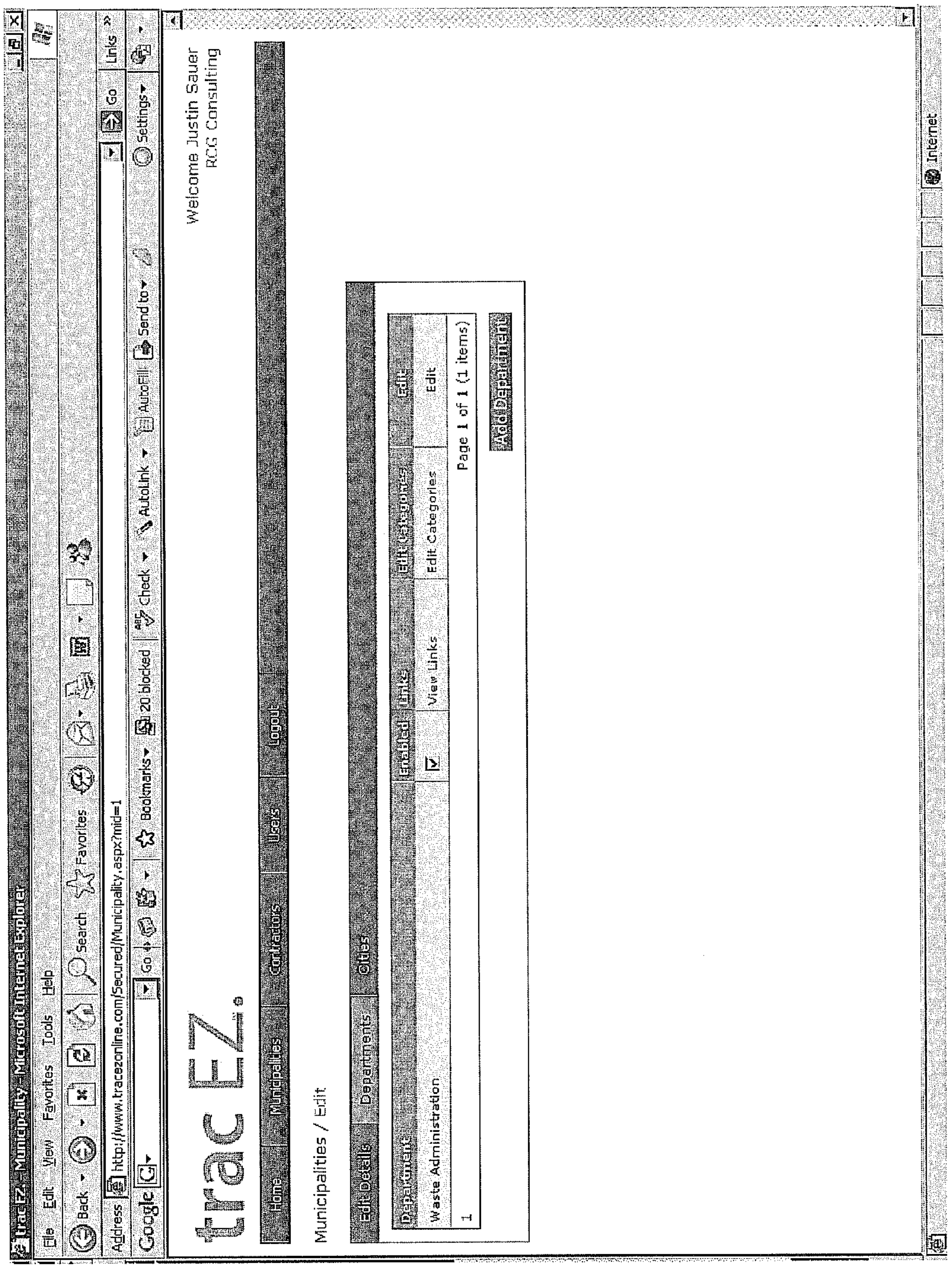

Referring to FIG. 29, upon selection of "Edit", a list of all the municipalities stored in the municipality database is displayed. A further "Edit" selection is associated with each municipality in the list. Referring to FIG. 30, upon use of the further "Edit" selection, the municipality information form is displayed and information can be edited or changed. In FIG. 31, the "Departments" section of the municipality information form is displayed. Additional departments can be added and information about existing departments can be edited.

Figure 32:
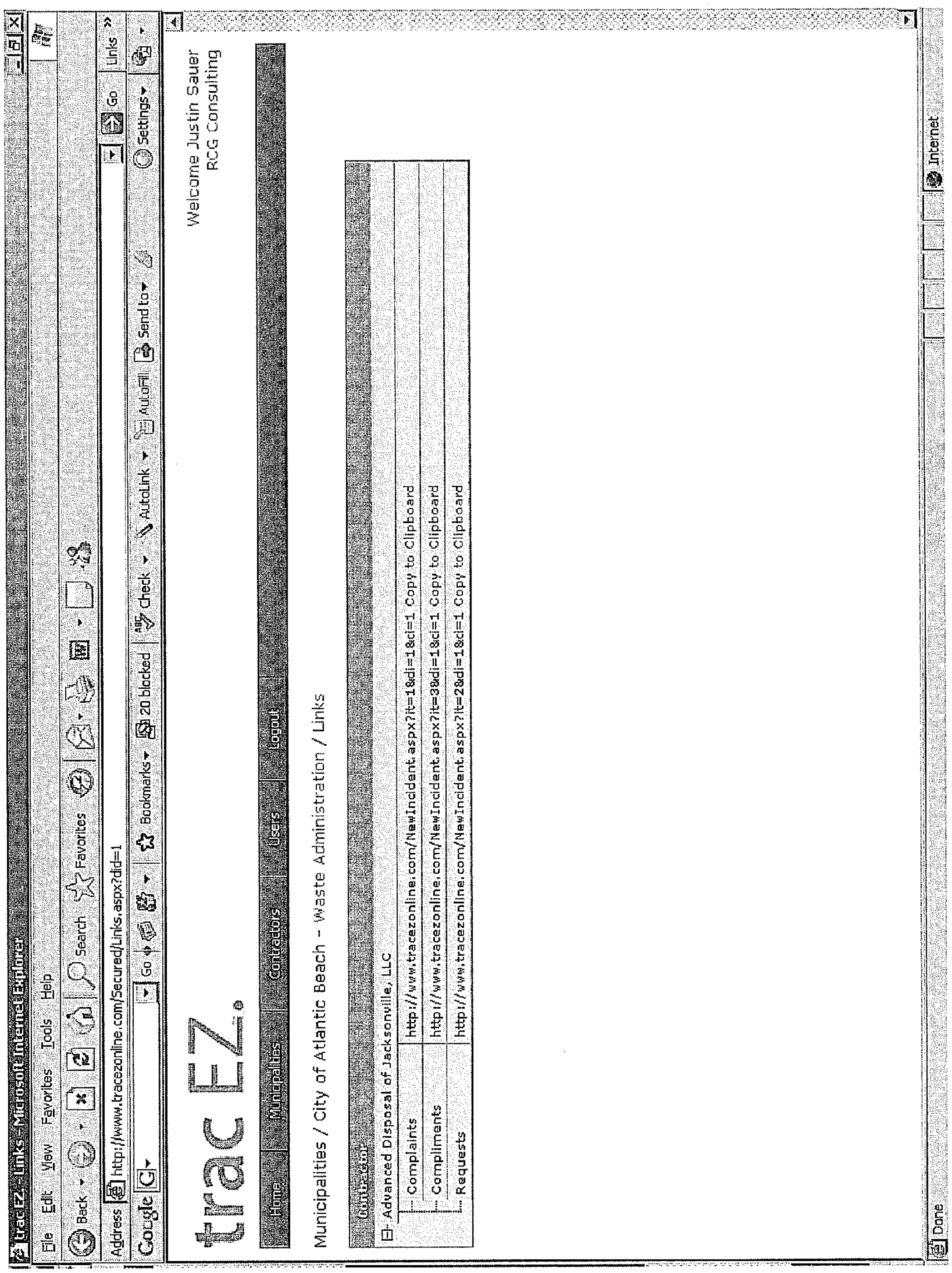

In the "Departments" section, the user can select to see "Links" associated with each department of municipality. Referring to FIG. 32, upon selection of "Links", web addresses associated with complaints, compliments and requests forms associated with that department of the municipality. Accessing of these links allows addition of new complaints, compliments and requests, respectively, as discussed above in connection with FIGS. 15-20.

The links can be copied and used on websites associated with the corresponding department of the municipality. For example, in the Waste Administration section of a municipality's website, invitations to "Submit a Complaint", "Submit a Compliment" and "Submit a Request" are associated with the respective links. Server access through such links constitutes the beneficiary interface submodule. Additionally, selection of "Edit Categories" allows the user to pre-enter categories associated with complaints and requests to that department.

Figure 33:
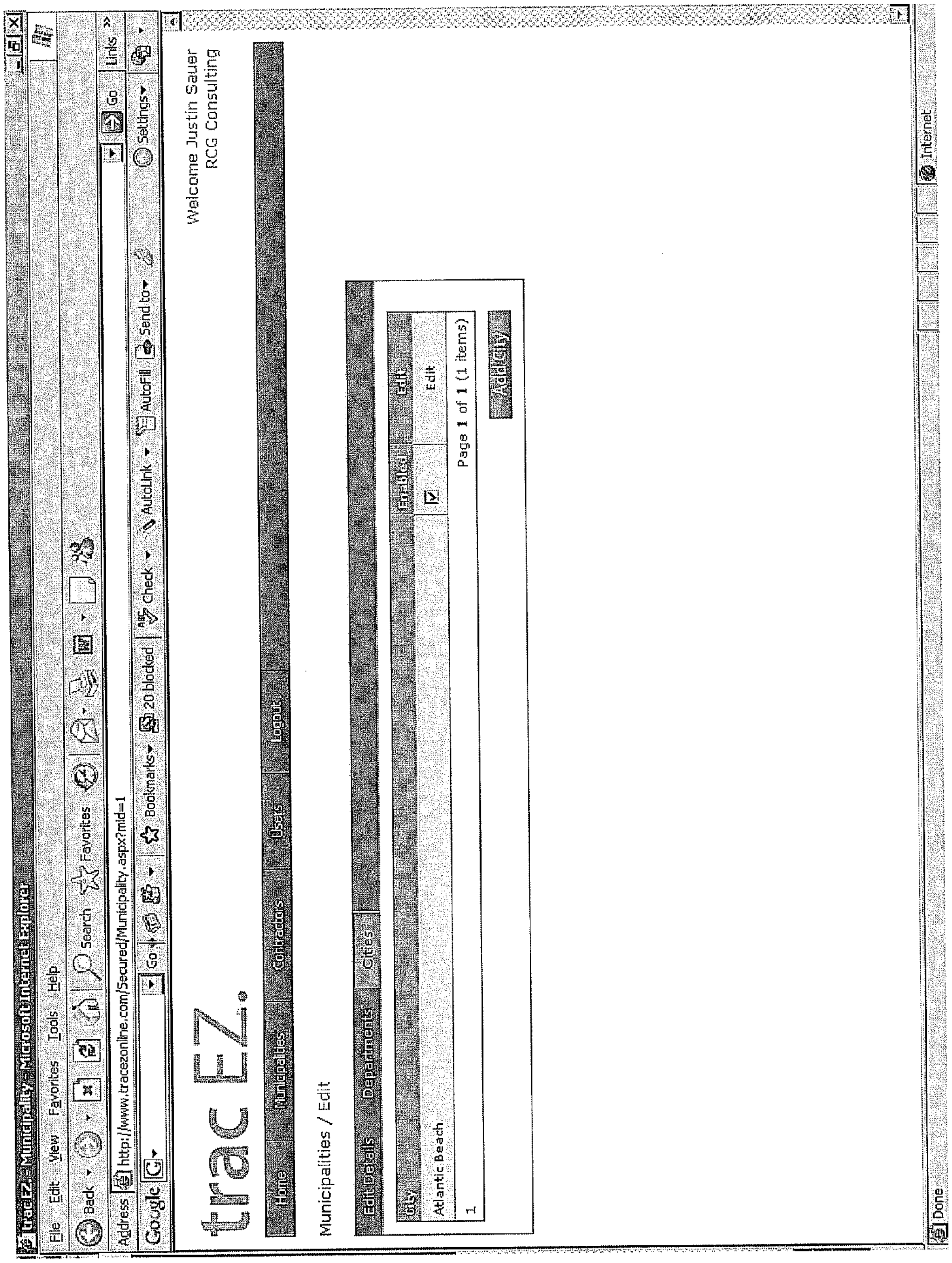

Referring to FIG. 33, in the "Cities" section, cities associated with the municipality can be added or edited. These city names would then be available for selection in forms for generating new complaints, compliments and requests.

Selecting the "Contractors" drop down menu, as with the "Municipalities" drop down menu, results in the display of further "Add" and "Edit" selections. Selection of "Add" displays a contractor information form for entering information about the contractor. Referring to FIG. 34, selection of "Edit" displays a list of all contractors in the garbage haulers database. A further "Edit" selection is associated with each contractor, which will allow display of the associated contractor information form.

Figure 35:
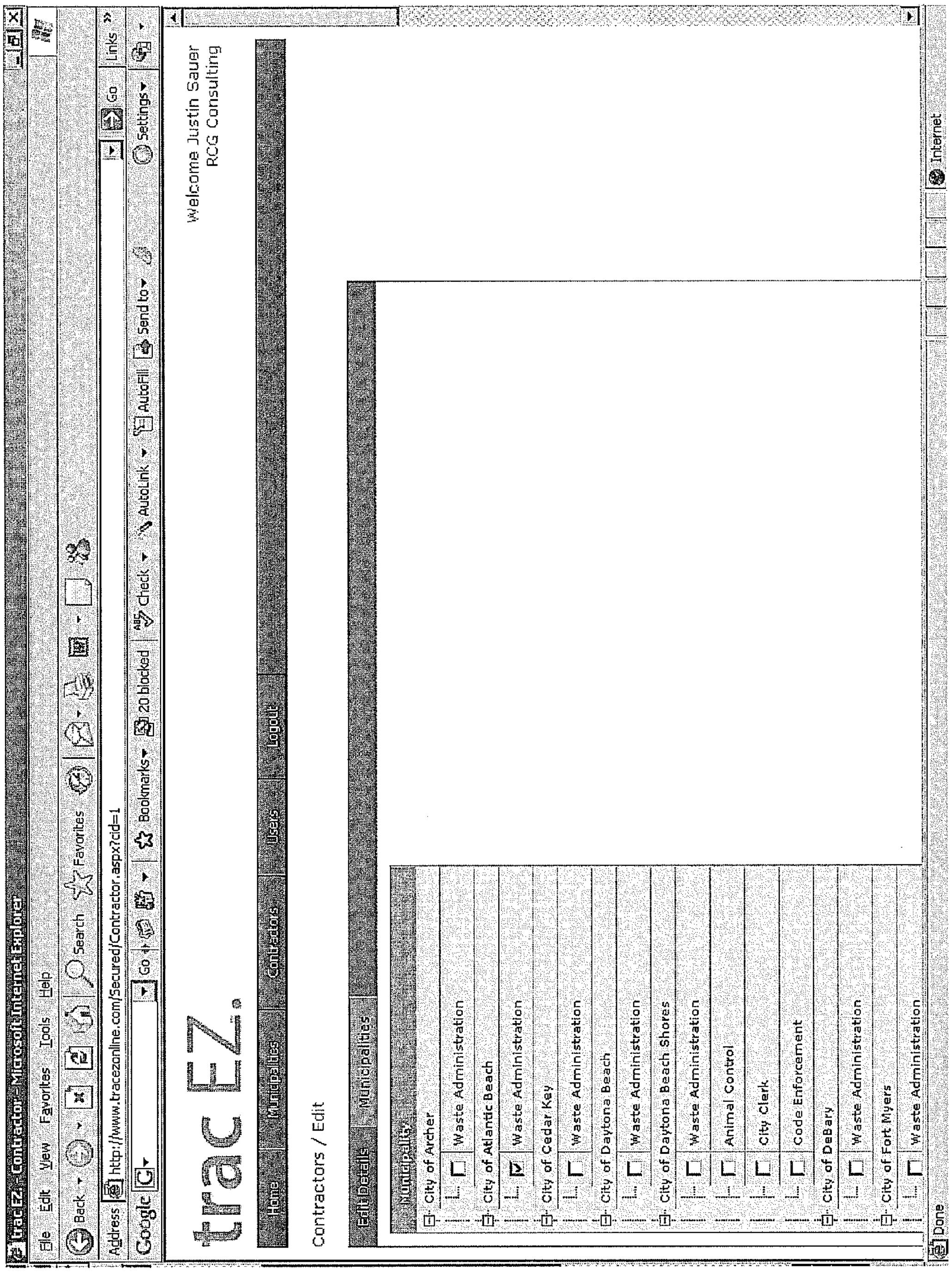

Referring to FIG. 35, the contractor information form includes a "Municipality" section, which allows the user to associate the garbage hauler, or other contractor, with one or departments of one or more manipulates. Association of the contractor with the department of the municipality will enable the contractor to view and receive notification of incidents submitted in connection with that department.

Figure 36:
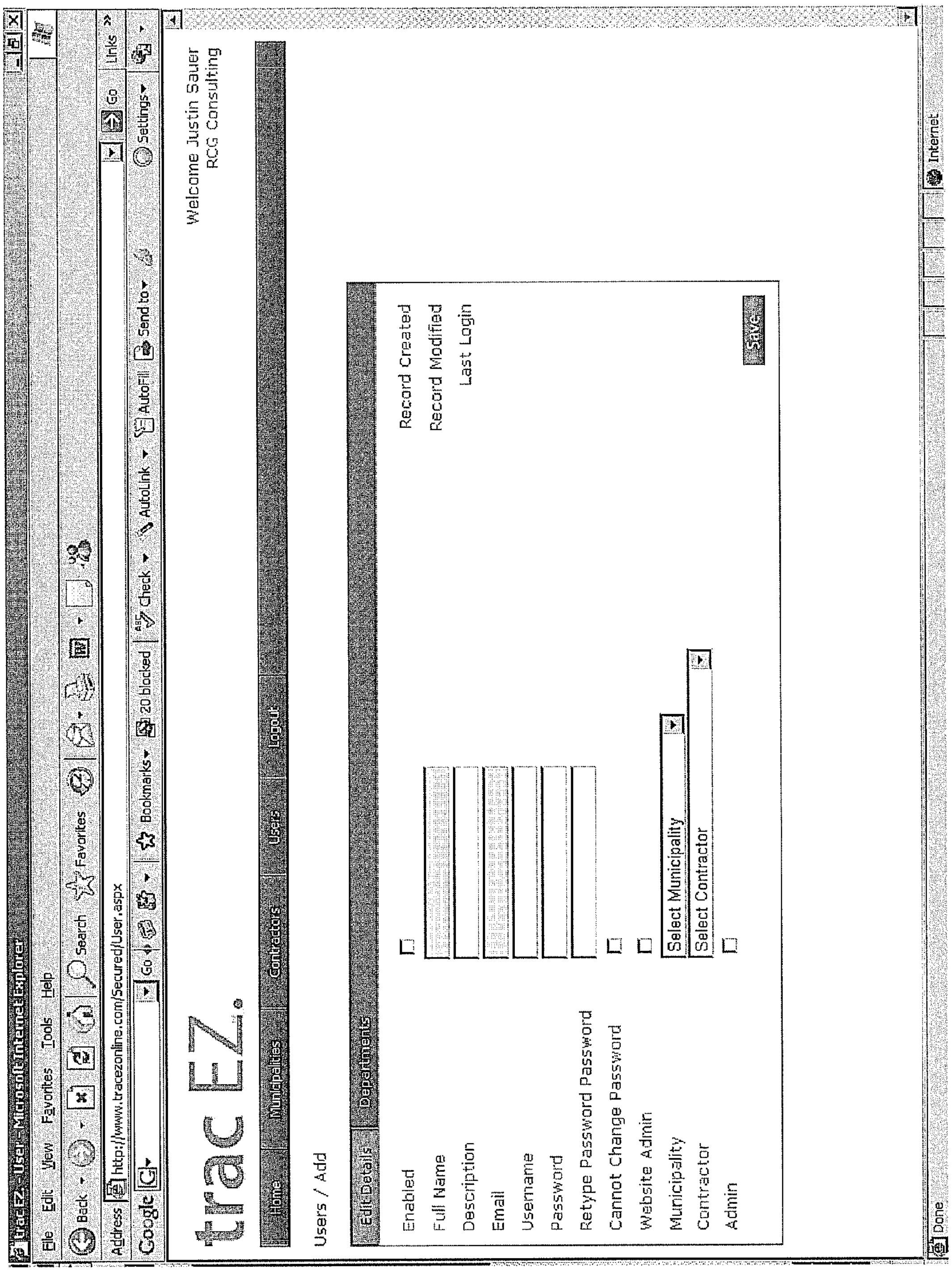

Selecting the "Users" drop down menu, as with the "Municipalities" and "Contractors" drop down menus, results in the display of further "Add" and "Edit" selections. Selection of "Add" displays a user information form for entering information about the user. Referring to FIG. 36, the user information form displayed to the system administration-associated user differs form the user information forms displayed to municipality- or garbage hauler-associated users (with admin permissions) in that the user can be associated with any municipality or contractor, or can be given system administrative permission.

Figure 37:
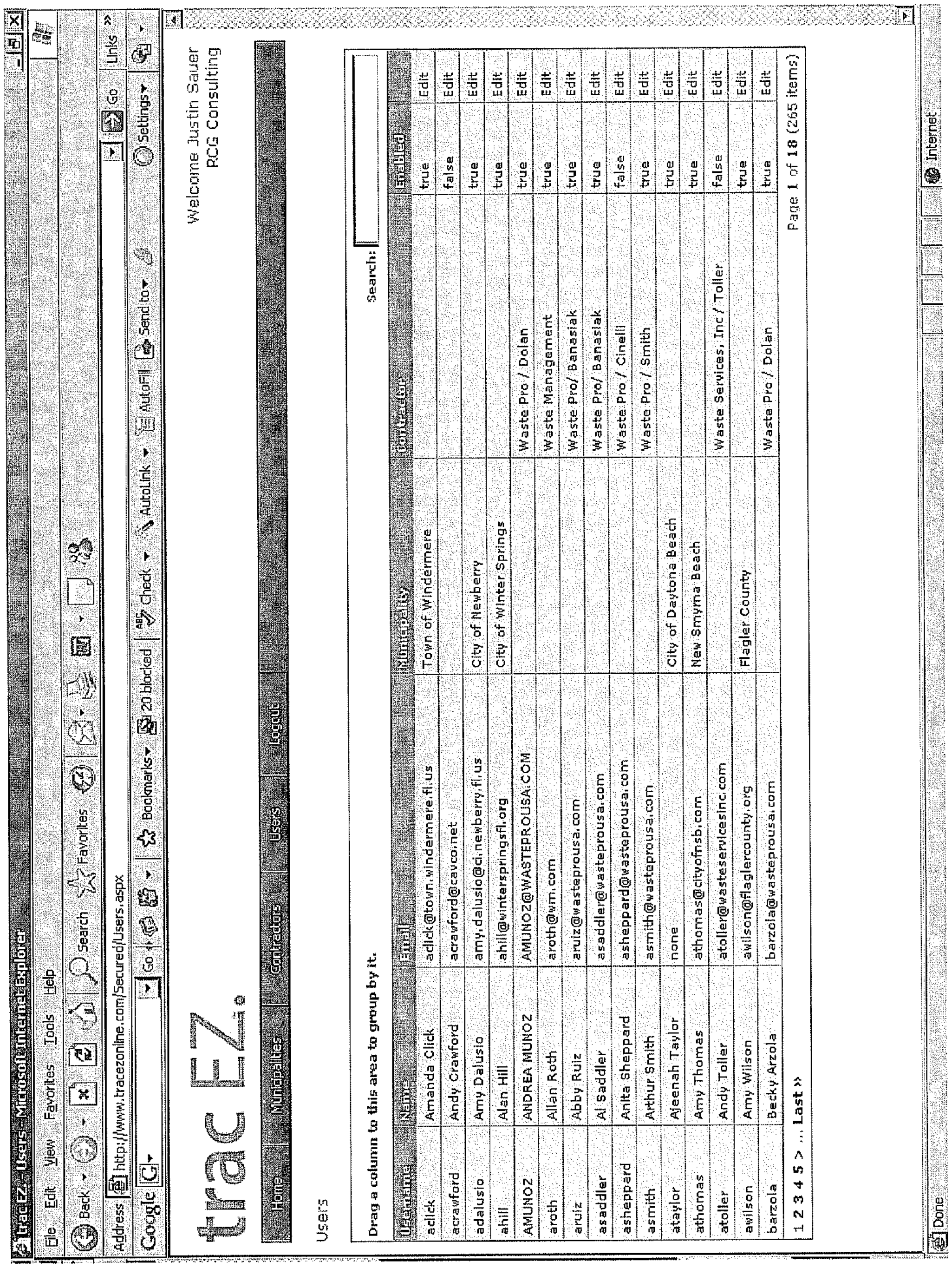

Referring to FIG. 37, selection of "Edit" displays a list of all users in the users database. A search box allows the list of users to be searched. A further "Edit" selection is associated with each user, which will allow display of the associated user information form.

The above-described embodiment is provided for exemplary purposes; the present invention is not necessarily limited to such an embodiment. Instead, those skilled in the art will appreciate that various modification, as well as adaptations for particular circumstances, are possible within the scope of the present invention.

For example, while the described embodiment is described in the context of facilitating and tracking of contractual obligation between municipalities and garbage haulers (and includes features and aspects particularly advantageous in connection therewith), the present invention is not necessarily limited to such an application. Nor is the present invention necessarily limited to facilitating and tracking of strictly contractual obligations between parties. For example, the present invention could be usefully employed in the context of facilitating and tracking performance of responsibilities between different divisions of a corporation.

The foregoing is not an exhaustive list of possible variations. Rather, those skilled in the art will appreciate that these and other modifications and adaptations are possible within the scope of the invention herein shown and described and of the appended claims.

What is claimed is:

1. A garbage hauling contract compliance facilitation and tracking system comprising:

a hardware-based server configured with software to execute:

an interface module having a plurality of interface submodules, including at least a municipality interface submodule, a garbage hauler interface submodule and a beneficiary interface submodule; and a database module having cross-linked databases of municipalities and garbage haulers, and cross-linked databases of complaints relating to performance by the garbage haulers;

wherein:

the municipality interface submodule allows municipality users to search for the garbage hauling complaints, view details of the garbage hauling complaints, add new garbage hauling complaints, and generate reports of the garbage hauling complaints;

a contract service provider submodule allowing garbage haulers to search for the garbage hauling complaints, view details of the garbage hauling complaints, and generate reports of the garbage hauling complaints; and the beneficiary interface submodule allows contract beneficiaries to add new garbage hauling complaints; and the interface module allows the addition of new garbage hauling complaints by displaying at least one complaint form including fields in which identifying information about an initiator of the complaint is received and a plurality of selectable garbage hauling complaint categories.

2. The system of claim 1, wherein the municipality interface submodule and the garbage hauler interface submodule are accessed via user login screens and the beneficiary interface submodule is accessed via hyperlink to a complaint or request form on a website associated with the requesting entity or contract service provider.

3. The system of claim 1, wherein the municipality interface submodule further allows adding new municipality users and granting permissions to municipality users.

4. The system of claim 1, wherein the municipality interface submodule further allows municipality users to view a map of locations corresponding to the garbage hauling complaints.

5. The system of claim 1, wherein the municipality interface submodule further allows municipality users to view an editable form with detailed information about each of the garbage hauling complaints.

6. The system of claim 5, wherein the editable form allows the municipality user to indicate a resolution of each of the garbage hauling complaints.

7. The system of claim 6, wherein an email is automatically generated and set to the initiators of the garbage hauling complaints indicating the resolution.

8. The system of claim 1, wherein the municipality interface submodule displays elapsed times that the garbage hauling complaints have been open.

9. The system of claim 1, wherein the identifying information includes initiator address and the interface module verifies the received address.

10. The system of claim 1, wherein the complaint form allows uploading of files substantiating the complaint.

11. The system of claim 10, wherein the files include pictures substantiating the complaint.

12. The system of claim 1, wherein email notification of a submitted garbage hauling complaint is automatically generated and sent to the initiator and to selected users associated with the municipality and garbage hauler.

13. The system of claim 1, wherein the interface module generates a garbage hauling compliment form allowing entry of identifying information about an initiator of a garbage hauling compliment, comments related to the compliment and uploading of files related to the compliment.

14. The system of claim 1, wherein the interface module generates a garbage hauling request form allowing entry of identifying information about an initiator of a garbage hauling request, selection of pre-entered garbage hauling request categories and uploading of files related to the garbage hauling request.

15. The system of claim 1, wherein the interface module generates a garbage hauling complaint summary customization form allowing users to specify garbage hauling complaint summary criteria and generating the reports of garbage hauling complaints based thereon.

16. The system of claim 15, wherein the garbage hauling complaint summary criteria include a summary periodicity.

17. The system of claim 16, wherein the summary periodicity includes selections of daily, weekly, monthly and yearly.

18. A garbage hauling contract facilitation and tracking system comprising:

a hardware-based server configured with software to execute:

an interface module having a plurality of interface submodules, including at least a municipality interface submodule, a garbage hauler interface submodule and a beneficiary interface submodule; and a database module having cross-linked databases of municipalities and garbage haulers, and cross-linked databases of complaints relating to performance by the garbage haulers;

wherein:

the municipality interface submodule allows municipality users to search for the garbage hauling complaints, view details of the garbage hauling complaints, add new garbage hauling complaints, and generate reports of the garbage hauling complaints;

a contract service provider submodule for allowing garbage haulers to search for the garbage hauling complaints, view details of the garbage hauling complaints, and generate reports of the garbage hauling complaints; and the beneficiary interface submodule allows contract beneficiaries to add new garbage hauling complaints;

the interface module allows the addition of new garbage hauling complaints by displaying at least one complaint form including fields in which identifying information about an initiator of the complaint is received and a plurality of selectable garbage hauling complaint categories;

the municipality interface and garbage hauler interface submodules further allow municipality and garbage hauler users, respectively, to view a form with detailed information about each of the garbage hauling complaints entered into the complaint form, at least one of the municipality and garbage hauler users being allowed to indicate a resolution of each of the garbage hauling complaints.

19. The system of claim 18, wherein the interface module generates a garbage hauling complaint summary customization form allowing users to specify garbage hauling complaint summary criteria and generating the reports of garbage hauling complaints based thereon.

20. The system of claim 19, wherein the interface module automatically notifies designated users when new garbage hauling complaints are initiated and again when the garbage hauling complaints are resolved.

* * * * *